US 6,623,401 B2

(12) United States Patent
Idogawa et al.

(10) Patent No.: US 6,623,401 B2
(45) Date of Patent: Sep. 23, 2003

(54) COMBUSTION CONTROL APPARATUS FOR INTERNAL COMBUSTION ENGINE

(75) Inventors: Masanao Idogawa, Toyota (JP); Rihito Kaneko, Aichi-ken (JP); Senji Kato, Aichi-ken (JP); Hiroyuki Mizuno, Toyota (JP); Noboru Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/137,399

(22) Filed: May 3, 2002

(65) Prior Publication Data
US 2002/0128116 A1 Sep. 12, 2002

Related U.S. Application Data

(62) Division of application No. 09/656,250, filed on Sep. 6, 2000, now abandoned.

(30) Foreign Application Priority Data

Sep. 10, 1999 (JP) .............................. 11-257803
Jun. 13, 2000 (JP) ......................... 2000-176657

(51) Int. Cl.⁷ .......................... F02D 41/30; F02D 21/08
(52) U.S. Cl. ......................... 477/54; 477/62; 477/107; 123/295
(58) Field of Search ................... 123/295, 568.21; 477/54, 62, 65, 107

(56) References Cited

U.S. PATENT DOCUMENTS 5,836,287 A    11/1998  Yano et al.
6,029,622 A *   2/2000  Kadota et al. .............. 123/295
6,142,117 A *  11/2000  Hori et al. .................. 123/295
6,202,624 B1 *  3/2001  Stuerz et al. ............... 123/295
6,244,243 B1 *  6/2001  Mamiya et al. ............. 123/295

FOREIGN PATENT DOCUMENTS

| EP | 0 882 877 A2 | 12/1998 |
| EP | 0 884 463 A2 | 12/1998 |
| EP | 0 889 219 A2 | 1/1999 |
| EP | 0922847 A2 * | 6/1999 |
| EP | 0 924 419 A2 | 6/1999 |
| JP | 8-189405 | 7/1996 |
| JP | 9-195839 | 7/1997 |
| JP | 11-72032 | 3/1999 |
| JP | 11-182287 A * | 7/1999 |
| JP | 11-287143 A | 10/1999 |
| WO | WO/99/00591 A1 * | 1/1999 |

OTHER PUBLICATIONS

European Patent Office Communication dated Mar. 21, 2003 with attached European search report (3 pages).

* cited by examiner

Primary Examiner—Ankur Parekh
(74) Attorney, Agent, or Firm—Kenyon & Kenyon

(57) ABSTRACT

A combustion control apparatus for an internal combustion engine that switches combustion modes at the proper timing. At the time of switching from a stratified-charge combustion mode to a homogeneous-charge combustion mode, the angle of an EGR valve is changed to the angle needed for the homogeneous-charge combustion mode first. When a predetermined delay time elapses after a request for switching the combustion mode has been made, substantial mode switching is carried out. The delay time is set based on engine speed and engine load.

25 Claims, 22 Drawing Sheets ated with the running state of the engine at that time. In this respect, the delay time is set long to cope with various running states of the engine. In this case, stratified charge combustion with an insufficient amount of EGR gas continues during the period from the purging of the remaining EGR gas to the switching of the combustion mode. The insufficient EGR gas increases an NOx emission and the combustion speed, which leads to louder stratified-charge combustion noise.

COMBUSTION CONTROL APPARATUS FOR INTERNAL COMBUSTION ENGINE

This application is a divisional of application Ser. No. 09/656,250, now abandoned, which was filed on Sep. 6, 2000, and which is the U.S. National Stage application of JP 11-257803, filed Sep. 10, 1999.

BACKGROUND OF THE INVENTION

The present invention relates generally to a combustion control apparatus for an internal combustion engine, and, more particularly, to a combustion control apparatus that switches the combustion mode of an internal combustion engine between the homogeneous-charge combustion mode and the stratified-charge combustion mode in accordance with the running state of the engine.

In an in-cylinder injection type internal combustion engine that injects fuel directly into a cylinder, fuel is injected in the compression stroke immediately before ignition and a flammable air-fuel mixture unevenly distributed only in the vicinity of each spark plug is ignited. This makes it possible to carry out combustion with a lean air-fuel ratio as an average in the whole combustion chamber, i.e., stratified charge combustion. During this stratified charge combustion, the pumping loss can be reduced by narrowing the throttle angle even when the engine is running under a light load where the amount of fuel injection is small. As combustion mainly takes places near each spark plug, the cooling loss can also be reduced, thus resulting in a significant improvement in the fuel efficiency.

In stratified charge combustion, while the overall air-fuel ratio is low, the air-fuel ratio in the vicinity of the spark plug is high so that the combustion temperature near the spark plug is high. Therefore, the amount of NOx produced tends to increase in stratified-charge combustion mode. What is more, because the amount of intake air is large in stratified-charge combustion mode, that tendency grows further. To restrain the production of NOx in stratified charge combustion, therefore, a large amount of EGR (Exhaust Gas Recirculation) gas is supplied.

In the in-cylinder injection type internal combustion engine, fuel is injected in the suction stroke to evenly blend fuel and air in the combustion chamber. This combustion mode is called "homogeneous charge combustion".

Recently, an internal combustion engine which uses an in-cylinder injection system and switches the combustion mode between the homogeneous-charge combustion mode and the stratified-charge combustion mode in accordance with the running state of the engine has been put to a practical use.

At the time of changing the combustion mode, the throttle position or angle, the fuel injection timing, the ignition timing and the angle of an EGR valve provided in the EGR passage where the EGR gas flows are changed. When the combustion mode is switched to the homogeneous-charge combustion mode from the stratified-charge combustion mode, for example, the angle of the EGR valve is controlled to decrease the amount of EGR gas supplied.

It is to be noted however that even after the angle of the EGR valve is changed at the time of mode switching to the homogeneous-charge combustion mode, a large amount of EGR gas remains in the intake manifold or combustion chamber over a certain period of time. Immediately after the stratified-charge combustion mode is switched to the homogeneous-charge combustion mode, therefore, excess EGR gas lowers the combustion speed, thus increasing the possibility of misfire. Misfire causes a torque change, which degrades the drivability.

Japanese Unexamined Patent Publication (KOKAI) No. Hei 8-189405 and Japanese Unexamined Patent Publication (KOKAI) No. Hei 9-195839 disclose a conventional in-cylinder injection type internal combustion engine. At the time the stratified-charge combustion mode is switched to the homogeneous-charge combustion mode in this engine, first, the angle of the EGR valve is changed to the angle that matches with the homogeneous-charge combustion mode. Then, the combustion mode is switched after passing of a delay time sufficient for the EGR gas in the combustion chamber to decrease to the proper amount.

The time the EGR gas remains (remaining time) since the alteration of the angle of the EGR valve varies significantly depending on the running state of the engine at that time. In this respect, the delay time is set long to cope with various running states of the engine. In this case, stratified charge combustion with an insufficient amount of EGR gas continues during the period from the purging of the remaining EGR gas to the switching of the combustion mode. The insufficient EGR gas increases an NOx emission and the combustion speed, which leads to louder stratified-charge combustion noise.

To prevent the NOx emission from increasing and suppress the stratified-charge combustion noise, therefore, it is desirable to switch the combustion mode as early as possible after the angle of the EGR valve is changed. When the delay time is set short, however, depending on the running state of the engine, misfire-originated degradation of the drivability cannot be suppressed sufficiently.

SUMMARY OF THE INVENTION

Accordingly, it is an object of the present invention to provide a combustion control apparatus for an internal combustion engine that switches the stratified-charge combustion mode to the homogeneous-charge combustion mode at the proper timing.

To achieve the above object, the present invention provides a combustion control apparatus for an internal combustion engine that has an exhaust manifold, an intake manifold, an EGR passage for connecting the exhaust manifold to the intake manifold, and an EGR valve disposed in the EGR passage, and runs in a stratified-charge combustion mode or a homogeneous-charge combustion mode in accordance with a running state. The combustion control apparatus includes angle changing means, mode switching means, and delay-time setting means. The angle changing means changes an angle of the EGR valve to an angle needed for the homogeneous-charge combustion mode at a time of switching a combustion mode from the stratified-charge combustion mode to the homogeneous-charge combustion mode. The mode switching means switches from the stratified-charge combustion mode to the homogeneous-charge combustion mode when a predetermined delay time elapses after a request for switching the combustion mode has been made. The delay-time setting means sets the delay time based on engine speed and engine load.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A combustion control apparatus for an internal combustion engine according to the first embodiment of this invention will now be described in detail with reference to the accompanying drawings.

Figure 1:
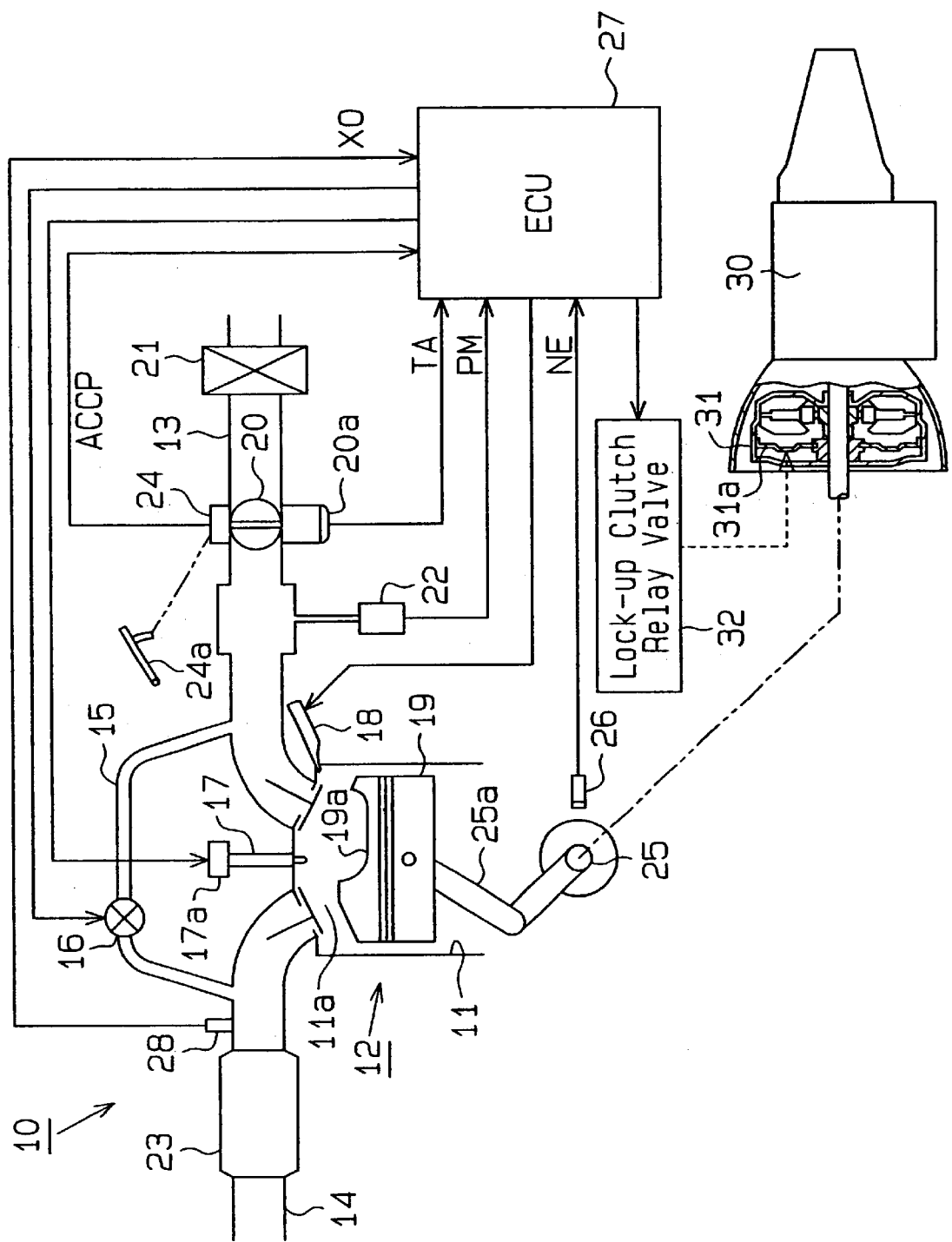
FIG. 1 is a schematic diagram of an engine and a combustion control apparatus according to a first embodiment of this invention.

As shown in FIG. 1, an in-cylinder injection type engine 10, which is mounted in a vehicle, has an engine body 12, an intake manifold 13, an exhaust manifold 14, an EGR passage 15 that connects the intake manifold 13 to the exhaust manifold 14, and an EGR valve 16 disposed in the EGR passage 15.

Injectors 18 are located above respective combustion chambers 11a. Each injector 18 injects fuel directly in an associated cylinder 11 of the engine body 12. A piston 19 is disposed in each cylinder 11. A dent 19a is formed at the top of the piston 19. The space in the dent 19a constitutes a part of the combustion chamber 11a. Provided at the top wall of the combustion chamber 11a is a spark plug 17 that ignites an air-fuel mixture. The ignition timing of the spark plug 17 is adjusted by an igniter 17a.

The air-fuel mixture is burned in the combustion chamber 11a to reciprocate the piston 19. The movement of the piston 19 is converted to rotational movement of a crankshaft 25 via a connecting rod 25a. A rotational speed sensor 26 is located near the crankshaft 25 and detects the rotational speed of the crankshaft 25 or an engine speed NE.

A throttle valve 20, disposed in the intake manifold 13, serves to change the flow area of the intake manifold 13. A throttle sensor 20a and an acceleration sensor 24 are located near the throttle valve 20. The throttle sensor 20a detects the position or angle, TA, of the throttle valve 20. The acceleration sensor 24 detects a pedal depression degree ACCP of an acceleration pedal 24a. An air cleaner 21, disposed at the upstream portion of the throttle valve 20, purifies the intake air. Disposed at the downstream portion of the throttle valve 20 is a pressure sensor 22 that detects the inner pressure of the intake manifold 13 (intake manifold pressure PM).

A catalytic converter 23, disposed in the exhaust manifold 14, purges a toxic component in the exhaust gas. An oxygen sensor 28 disposed in the exhaust manifold 14 detects an oxygen concentration XO in the exhaust gas. The EGR passage 15 connects the upstream part of the catalytic converter 23 in the exhaust manifold 14 to the downstream part of the throttle valve 20 in the intake manifold 13. The differential pressure between the intake manifold 13 and the exhaust manifold 14 causes the exhaust gas to recirculate from the exhaust manifold 14 to the intake manifold 13 through the EGR passage 15. As the EGR valve 16 changes the flow area of the EGR passage 15, the amount of the EGR gas is adjusted by the EGR valve 16.

In the first embodiment, the crankshaft 25 is coupled to a transmission gear 30 via a torque converter 31 which transmits the torque using a fluid (oil) as a medium. The torque converter 31 has a lock-up clutch 31a that selectively couples the engine 10 to the transmission gear 30. The lock-up clutch 31a is hydraulically controlled by a lock-up clutch relay valve 32. Specifically, the lock-up clutch 31a is switched between an engage position (lock-up state) where the crankshaft 25 is mechanically and directly engaged with the input shaft of the transmission gear 30, and a release position (unlock state) where the crankshaft 25 is disengaged from the input shaft of the transmission gear 30. The lock-up clutch 31a is located at a position midway between the engage position and the release position or at a slip position. At the slip position, the crankshaft 25 is partially engaged with the input shaft of the transmission gear 30 and the relative rotation of the crankshaft 25 to the input shaft of the transmission gear 30 is permitted to some degree.

The electric circuits of the combustion control apparatus according to the first embodiment will now be discussed.

The output signals of the throttle sensor 20a, the pressure sensor 22, the acceleration sensor 24, the speed sensor 26 and the oxygen sensor 28 that are needed to control the operation of the engine 10 are supplied to an electronic control unit (ECU) 27. The ECU 27 is a group of electronic circuits including an engine control unit for controlling the engine 10 and a transmission control unit for controlling the lock-up clutch 31a and the transmission gear 30.

In accordance with the output signals of the individual sensors, the ECU 27 drives the igniters 17a, the injectors 18, the throttle valve 20 and the EGR valve 16 to control the engine 10 and drives the lock-up clutch relay valve 32 to control the lock-up clutch 31a. The ECU 27 also controls the combustion of the engine 10.

A description will now be given of the combustion control of the engine 10 in the first embodiment. The ECU 27 switches the combustion mode between the homogeneous-charge combustion mode and the stratified-charge combustion mode in accordance with the running state of the engine 10.

<Homogeneous-Charge Combustion Mode>

In homogeneous-charge combustion mode, fuel is injected in the first half of the suction stroke. The fuel injected at this timing forms a homogeneous air-fuel mixture in the combustion chamber 11a. The angle of the throttle valve 20 in homogeneous-charge combustion mode is adjusted by the pedal depression degree of the acceleration pedal 24a. In the homogeneous charge combustion, it is less necessary to mix the EGR gas in the intake air. That is, the amount of the EGR gas required is relatively small. The EGR valve 16 is throttled down in homogeneous-charge combustion mode as compared with in stratified-charge combustion mode.

<Stratified-Charge Combustion Mode>

In stratified-charge combustion mode, fuel is injected in the second half of the compression stroke near the ignition timing. The fuel injected at this timing is unevenly distributed or poorly distributed in the vicinity of the spark plug 17. A flammable air-fuel mixture is formed only in the vicinity of the spark plug 17 and combustion takes place with a very low air-fuel ratio. As the pumping loss is reduced in stratified-charge combustion mode, the throttle valve 20 is opened relatively wider. To secure the emission performance, the EGR valve 16 is opened large to permit a large amount of EGR gas flow in.

Figure 2:
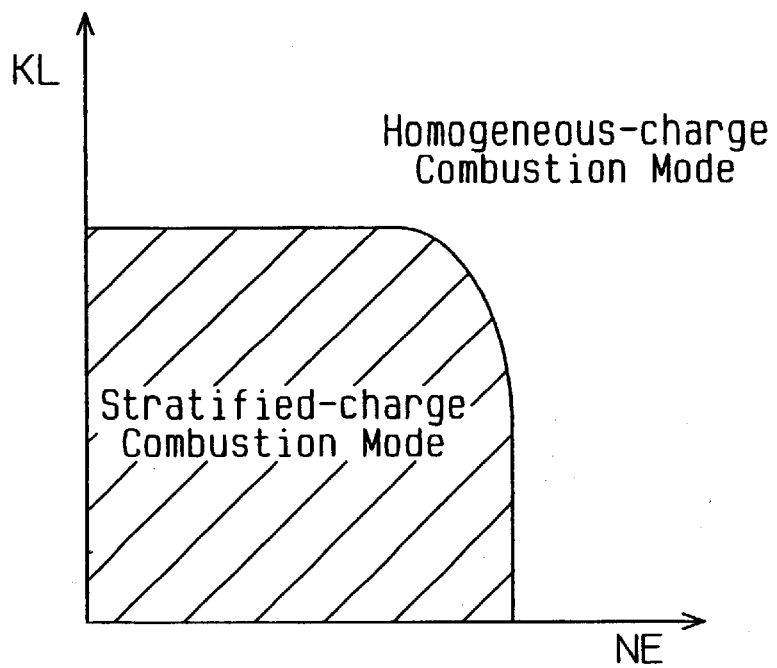
FIG. 2 is a graph showing the correlation between the running state of the engine and the combustion mode.

The homogeneous-charge combustion mode and the stratified-charge combustion mode are set in accordance with the engine speed NE and an engine load or torque KL. FIG. 2 exemplifies a map used in setting the combustion mode.

Basically, the homogeneous-charge combustion mode is set when the running state of the engine 10 is a high speed and high load state. The stratified-charge combustion mode, on the other hand, is set when the running state of the engine 10 is a low speed and low load state. The combustion mode may be switched, regardless of the running state of the engine, in accordance with a request for rich spike control or the like.

Referring now to FIGS. 3 to 6, a detailed description will be given of the control associated with mode switching from the stratified-charge combustion mode to the homogeneous-charge combustion mode.

Step 1: As the running state of the engine 10 changes or rich spike control is carried out, switching of the combustion mode is requested. Then, the angle of the EGR valve 16 is changed to the angle required for the homogeneous-charge combustion mode first.

Step 2: After the alteration of the angle of the EGR valve 16, the combustion control apparatus waits for the amount of the residual EGR gas to decrease to the level where no misfire will occur. Then, the angle of the throttle valve 20 is changed to the angle required for the homogeneous-charge combustion mode.

Step 3: After the alteration of the angle of the throttle valve 20, the combustion control apparatus waits for the amount of air actually supplied into the combustion chamber 11a to become the level that can ensure good homogeneous charge combustion without degrading drivability. Next, the control mode for the ignition-injection system, such as the ignition timing of the spark plug 17 or the fuel injection amount and fuel injection timing of the injector 18 is switched to the control mode for homogeneous charge combustion. This completes the switching of the combustion mode.

As apparent from the above, switching from the stratified-charge combustion mode to the homogeneous-charge combustion mode is carried out in the order of the EGR valve 16, the throttle valve 20 and the ignition-injection system. In the period from the point of alteration of the angle of the EGR valve 16 to the point of alteration of the angle of the throttle valve 20 or in the period from the point of alteration of the angle of the throttle valve 20 to the point of mode switching to the control mode for the ignition-injection system is set a delay time for restraining the degradation of the drivability.

The required angle of the EGR valve 16 in stratified-charge combustion mode varies according to the running state of the engine 10 or the engine speed NE and the engine load KL. When the running state of the engine 10 varies, for example, the amount of the EGR gas that is recirculated in the intake manifold 13 changes even if the angle of the EGR valve 16 is the same. Further, as the amount of air that flows in the combustion chamber 11a or the intake manifold 13 per unit time changes in accordance with the engine speed NE and the engine load KL, the EGR-gas remaining time changes in accordance with the engine speed NE and the engine load KL.

Further, the resistance to misfire caused by excess EGR gas in homogeneous-charge combustion mode and the degree of influence of misfire on the drivability also vary in accordance with the engine speed NE and the engine load KL. Therefore, the delay time for restraining the degradation of the drivability needed to switch the combustion mode (hereinafter this time is called "required delay time") also varies in accordance with the engine speed NE and the engine load KL.

Figure 3:
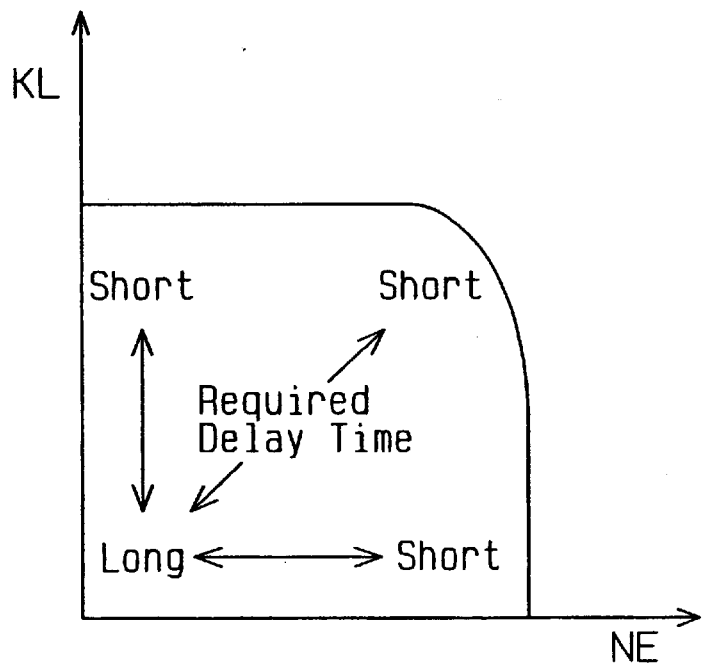
FIG. 3 is a graph showing the correlation between the running state of the engine and a required delay time.

FIG. 3 schematically illustrates the required delay time with respect to the engine speed NE and the engine load KL. The higher the engine speed NE and the greater the engine load KL, the shorter the required delay time tends to become.

If the delay time becomes excessively long, stratified charge combustion continues with an insufficient amount of EGR gas. It is therefore desirable to set the delay time as short as possible while avoiding the degradation of the drivability.

In the combustion control apparatus of the first embodiment, the delay time is set to as short a period as possible and as needed to suppress the degradation of the drivability, based on the engine speed NE and the engine load KL.

A detailed description will now be given of the actual process of switching the combustion mode with reference to the flowcharts in FIGS. 4 and 5.

Figure 4:
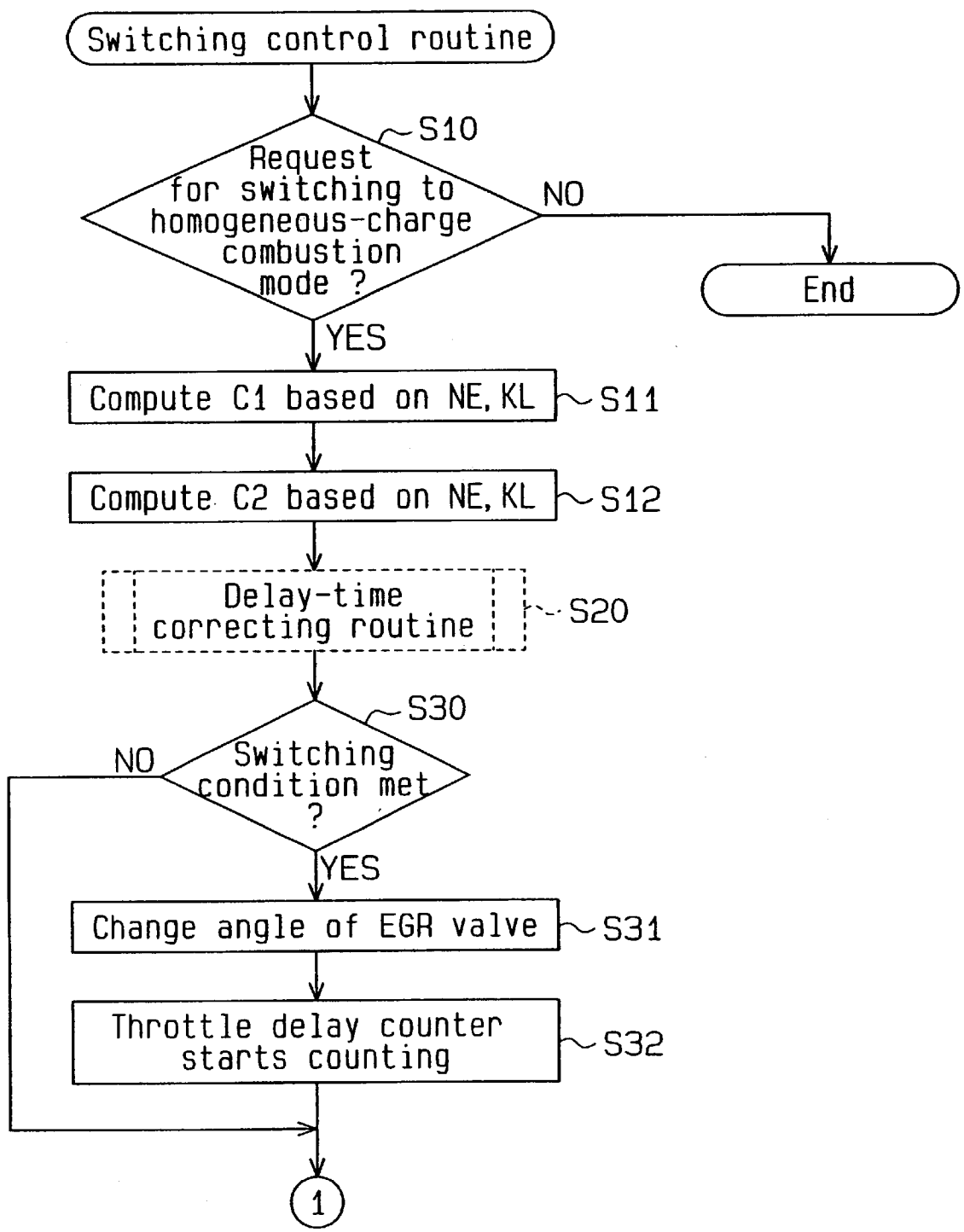
FIGS. 4 and 5 are flowcharts for a control routine for switching the combustion mode to the homogeneous-charge combustion mode.
Figure 5:
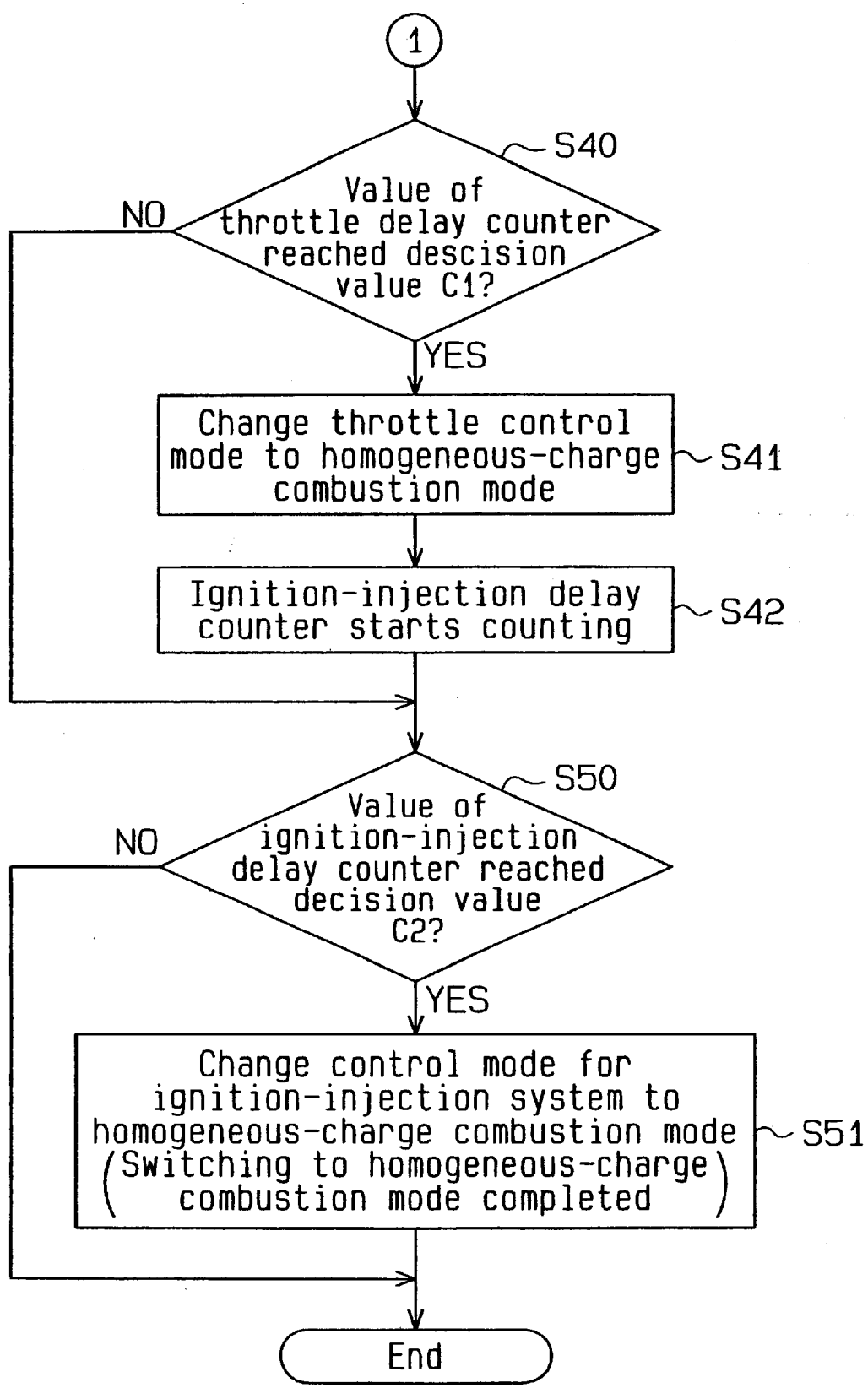

FIGS. 4 and 5 present the flowcharts for a control routine for switching the combustion mode to the homogeneous-charge combustion mode from the stratified-charge combustion mode. This switching control routine is executed periodically as an interrupt routine that is carried out at every predetermined time intervals.

First, in step 10, the ECU 27 checks if there is a request for switching the combustion mode to the homogeneous-charge combustion mode from the stratified-charge combustion mode. If there is such a request, the routine goes to step 11, and if not, this routine is temporarily terminated.

In step 11, the ECU 27 computes a throttle delay decision value C1 based on the engine speed NE and the engine load KL. This decision value C1 is used to determine the delay time from the point of alteration of the angle of the EGR valve 16 to the point of alteration of the angle of the throttle valve 20. The decision value C1 is computed by referring to the map that has the engine speed NE of the engine 10 and the engine load KL as parameters. The longer the required delay time (see FIG. 2) becomes, the larger the throttle delay decision value C1 is set.

In step 12, the ECU 27 computes an ignition-injection delay decision value C2 for the ignition-injection system based on the engine speed NE and the engine load KL. This decision value C2 is used to determine the delay time from the point of alteration of the angle of the throttle valve 20 to the point of mode switching to the control mode for the ignition-injection system. The longer the required delay time at that time becomes, the larger the ignition-injection delay decision value C2 is set.

According to the first embodiment, after the decision values C1 and C2 are computed based on the engine speed NE and the engine load KL, a process which is associated with the actual mode switching to the homogeneous-charge combustion mode is performed at and after step 30. Step 20 is skipped in the first embodiment.

In step 30, it is checked if the condition for switching the stratified-charge combustion mode to the homogeneous-charge combustion mode is met. Specifically, it is checked if the time is immediately after the switching request has been made. If it is not immediately after the switching request has been made (NO in step 30), the routine skips steps 31 and 32 and goes to step 40 in FIG. 5.

If it is immediately after the switching request has been made (YES in step 30), the routine moves to step 31. In step 31, the ECU 27 changes the angle of the EGR valve 16 to the angle needed for the homogeneous-charge combustion mode. In step 32, the ECU 27 starts the counting operation of a throttle delay counter. The count value of the throttle delay counter is incremented every time this routine is executed.

In step 40, the ECU 27 checks if the value of the throttle delay counter has reached the throttle delay decision value C1. If the count value has not reached this decision value C1 yet (NO in step 40), the routine skips steps 41 and 42 and goes to step 50.

If the count value has reached the throttle delay decision value C1 (YES in step 40), the routine advances to step 41. In step 41, the ECU 27 changes the angle of the throttle valve 20 to the angle needed for the homogeneous-charge combustion mode. That is, at the time of switching the combustion mode to the homogeneous-charge combustion mode, the angle of the EGR valve 16 is changed first, and after the delay time determined by the throttle delay decision value C1 passes, the angle of the throttle valve 20 is changed.

In step 42, the ECU 27 starts the counting operation of an ignition-injection delay counter. The count value of the ignition-injection delay counter is incremented every time this routine is performed.

In step 50, the ECU 27 checks if the value of the ignition-injection delay counter has reached the ignition-injection delay decision value C2. If the count value has not reached this decision value C2 (NO in step 50), this routine is temporarily terminated.

If the count value of the ignition-injection delay counter has reached the ignition-injection delay decision value C2 (YES in step 50), a process in step 51 is performed after which this routine is temporarily terminated.

In step 51, the ECU 27 changes the control mode for the ignition-injection system to the homogeneous-charge combustion mode. That is, the ECU 27 changes the ignition timing of the spark plug 17 and the fuel injection timing and/or the fuel injection amount of the injector 18 to ones that match with the homogeneous charge combustion. When the control mode for the ignition-injection system is switched to the homogeneous-charge combustion mode, mode switching from the stratified-charge combustion mode to the homogeneous-charge combustion mode is completed.

Figure 6:
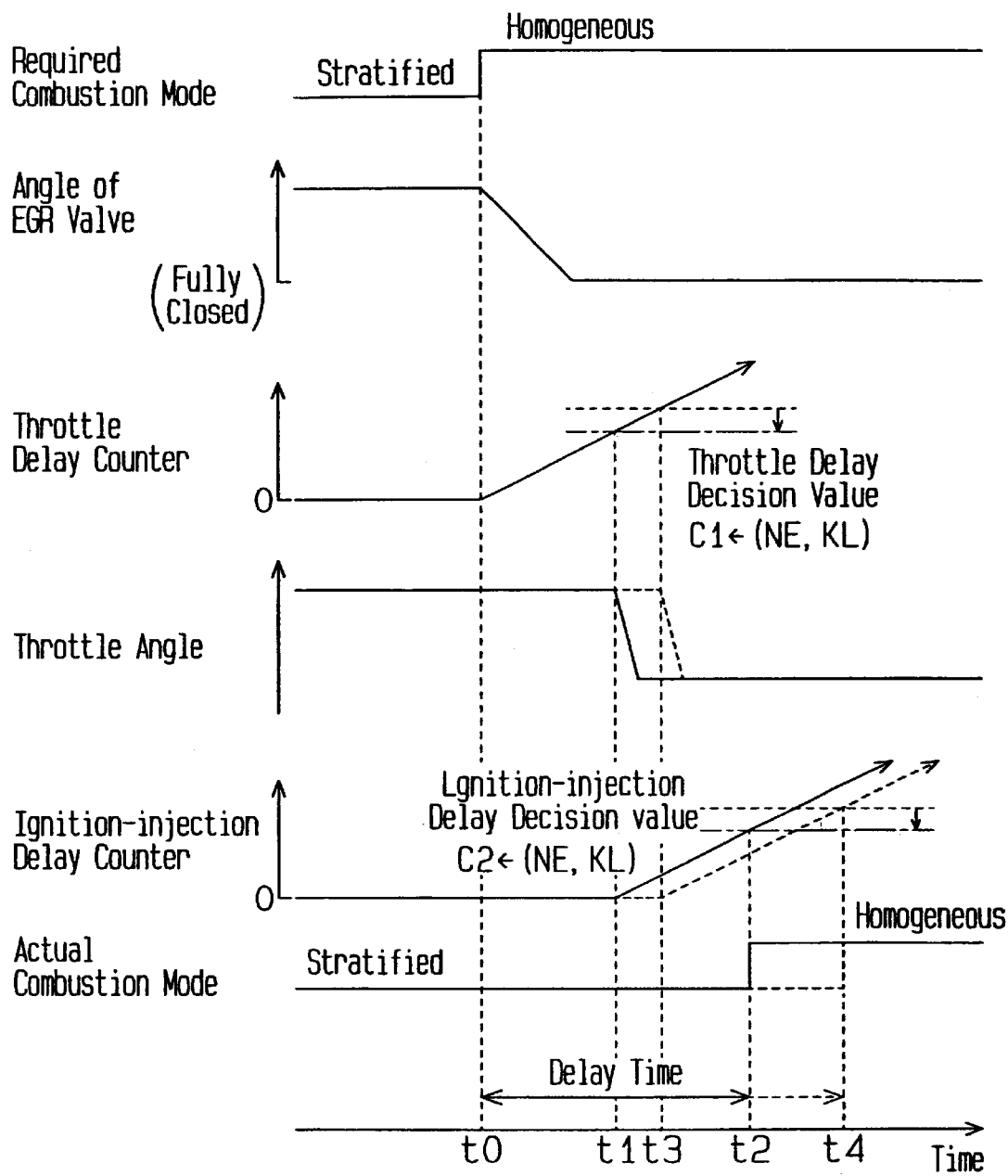
FIG. 6 is a timing chart for one example of combustion control according to the first embodiment.

FIG. 6 is a timing chart which exemplifies control for switching from the stratified-charge combustion mode to the homogeneous-charge combustion mode.

At time t0, the required combustion mode is switched to the homogeneous-charge combustion mode from the stratified-charge combustion mode. The angle of the EGR valve 16 is gradually decreased from time t0 and is changed to the angle needed for the homogeneous-charge combustion mode. The required angle in homogeneous-charge combustion mode is set fully closed. The counting of the throttle delay counter starts at time t0.

At time t1, the value of the throttle delay counter reaches the throttle delay decision value C1. At time t1, the angle of the throttle valve 20 is gradually changed to the angle needed for the homogeneous-charge combustion mode. Note that the throttle delay decision value C1 is set to secure the delay time needed to reduce the remaining EGR gas at the engine speed NE and engine load KL at that time.

At time t1, the counting of the ignition-injection delay counter starts.

At time t2, the value of the ignition-injection delay counter reaches the ignition-injection delay decision value C2. At this time t2, the control mode for the ignition-injection system is switched to one that matches the homogeneous-charge combustion mode, and the actual combustion mode is switched from the stratified-charge combustion mode to the homogeneous-charge combustion mode.

The broken lines in FIG. 6 show the control in the case where the required delay time is longer than that in the above-described case. In this case, the two decision values C1 and C2 are set larger than those of the above-described case. As a result, the time of changing the angle of the throttle valve 20 becomes time t3 and the time of switching the control mode for the ignition-injection system becomes time t4. Therefore, the total delay time from the time when the switching request has been made to the completion of combustion mode switching is set longer in accordance with the required delay time.

According to the first embodiment, as apparent from the above, at the time of switching the combustion mode from the stratified-charge combustion mode to the homogeneous-charge combustion mode, the delay time from the point when the angle of the EGR valve 16 to the angle needed for the homogeneous-charge combustion mode to the point when the combustion mode is switched is set based on the engine speed NE and the engine load KL. In accordance with a change in the EGR-gas remaining time or resistance to misfire that is caused according to the engine speed NE and the engine load KL, the delay time is adjusted properly. It is therefore possible to effectively suppress the deterioration of the NOx emission and an increase in stratified charge combustion noise while securing only the required delay time to prevent the degradation of the drivability but without making the delay time unnecessarily long.

The combustion control apparatus of the first embodiment has the following advantages.

(1) At the time of switching the stratified-charge combustion mode to the homogeneous-charge combustion mode, first, the angle of the EGR valve 16 is changed to the angle needed for the homogeneous-charge combustion mode and after the delay time that has been set based on the engine speed NE and the engine load KL has elapsed, the actual combustion mode is switched. Therefore, it is possible to set the delay time needed to suppress the degradation of the drivability irrespective of a change in EGR-gas remaining time and a change in resistance to misfire. This suppresses the degradation of the drivability and prevents the NOx emission from increasing or the stratified charge combustion noise from increasing, thus ensuring smooth switching from the stratified-charge combustion mode to the homogeneous-charge combustion mode.

The combustion control apparatus of the first embodiment may be modified as follows.

The decision values C1 and C2 may be set in such a way that the delay time is changed by changing the increments of the delay counters in accordance with the engine speed NE and the engine load KL. The essential point is that at the time of switching the combustion mode to the homogeneous-charge combustion mode, the delay time from the alteration of the EGR valve 16 to the switching of the combustion mode should be set based on the engine speed NE and the engine load KL.

Instead of separately making variable setting of the throttle delay time and the ignition-injection delay time, one of them may be set variably. It is essential that the delay time from the alteration of the EGR valve 16 to the switching of the combustion mode should be set based on the engine speed NE and the engine load KL.

The following descriptions of the second to tenth embodiments are centered around the differences from the first embodiment. The same reference symbols as given to the components of the first embodiment will also be used for those components which are similar or identical to the components of the first embodiment.

Second Embodiment

Generally speaking, the operation of the EGR valve 16 suffers from a response delay. When the running state of the engine 10 is in the transient state, for example, a difference between the real angle (actual angle) of the EGR valve 16 and the angle needed to accord with the engine speed NE and engine load KL at that time may occur. The EGR-gas remaining time changes in accordance with the actual angle of the EGR valve 16. When this difference is large, therefore, the EGR-gas remaining time cannot be accurately determined by referring to the engine speed NE and the engine load KL alone, making it difficult to set the adequate delay time.

When the actual angle of the EGR valve 16 is smaller than the required angle, for example, the actual EGR-gas remaining time is shorter than the time that is estimated based on the required angle. If the delay time is set in accordance with the required angle, stratified charge combustion continues with an insufficient amount of EGR gas. This impairs the NOx emission and increases the stratified charge combustion noise. According to the second embodiment, the delay time is set based not only on the engine speed NE and the engine load KL but also on the actual angle of the EGR valve 16.

Figure 7:
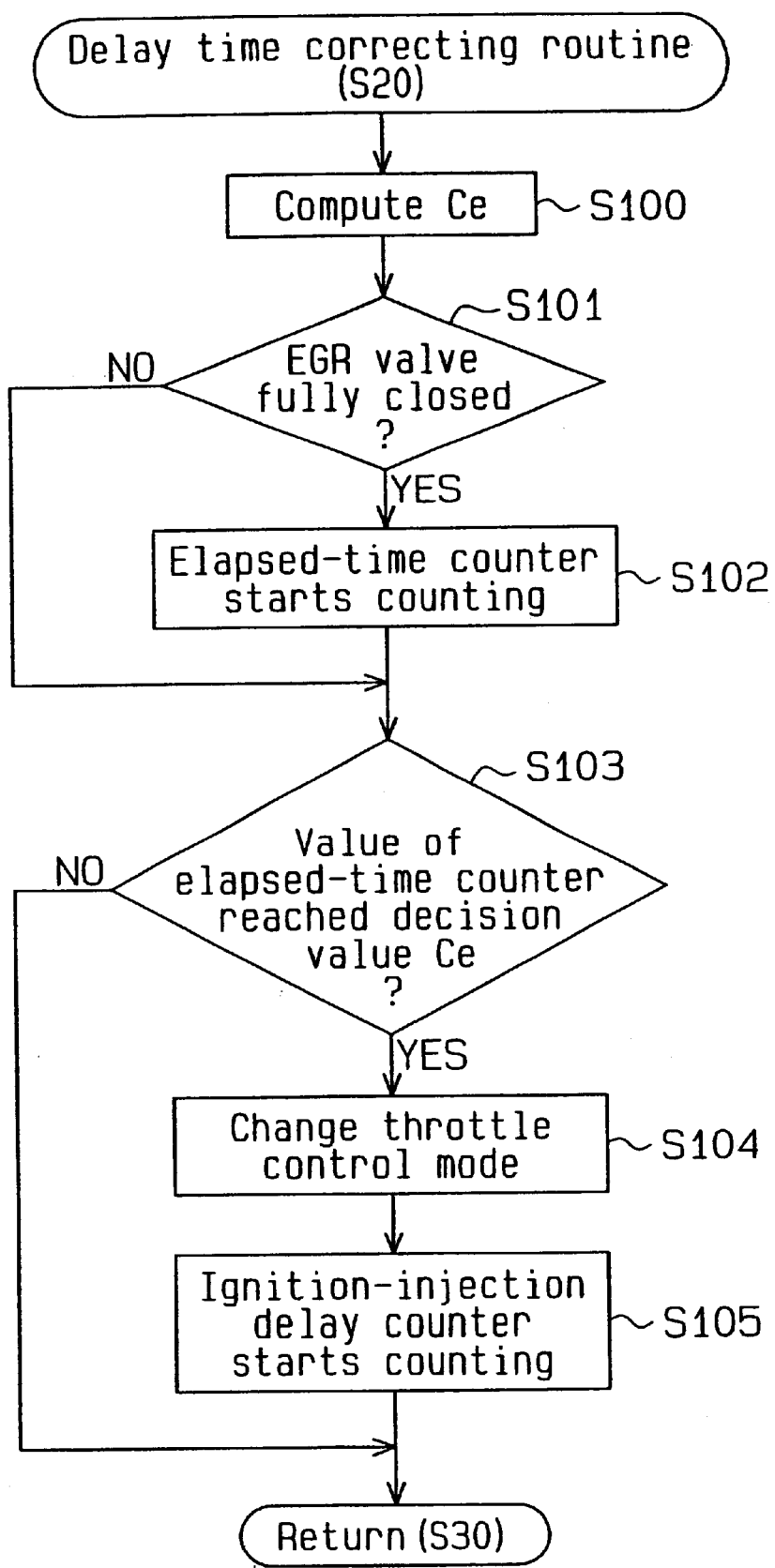
FIG. 7 is a flowchart of a delay-time correcting routine according to a second embodiment of this invention.

A delay-time correcting routine associated with setting of the delay time according to the second embodiment will be discussed specifically by referring to the flowchart in FIG. 7. The routine in FIG. 7 is a subroutine that is executed in step 20 in the control routine in FIG. 4.

When the routine proceeds to this delay-time correcting routine, in step 100, the ECU 27 first computes a decision value Ce in accordance with the actual angle of the EGR valve 16 when a request for switching the combustion mode is made. The decision value Ce is used to set the delay time based on the actual angle of the EGR valve 16. That is, the decision value Ce is set in such a way that the delay time is adjusted to match with the EGR-gas remaining time estimated in accordance with the actual angle of the EGR valve 16 at the time the mode switching request has been made.

In step 101, the ECU 27 checks if the angle of the EGR valve 16 has reached the angle needed for the homogeneous-charge combustion mode. If the former angle has not reached the needed angle (NO in step 101), the routine skips step 102 and goes to step 103.

When the former angle has reached the needed angle (YES in step 101), the routine goes to step 102. In step 102, the ECU 27 starts the counting operation of an elapsed-time counter which indicates the time elapsed since the point where the angle of the EGR valve 16 has reached the angle needed for the homogeneous-charge combustion mode. The count value of the elapsed-time counter is incremented every time this delay-time correcting routine is performed.

In step 103, the ECU 27 checks if the value of the elapsed-time counter has reached the decision value Ce. If the former value has not reached the decision value Ce (NO in step 103), the routine skips steps 104 and 105 and returns to step 30. If the count value has reached the decision value Ce (YES in step 103), on the other hand, the routine proceeds to step 104.

In steps 104 and 105, the same processes as done in steps 41 and 42 in FIG. 5 are performed. That is, the ECU 27 changes the angle of the throttle valve 20 to the angle needed for the homogeneous-charge combustion mode in step 104 and starts the counting operation of the ignition-injection delay counter in step 105. Then, the routine returns to step 30 in FIG. 4 from this delay-time correcting routine.

Of the setting in steps 104 and 105 and the setting in steps 41 and 42, the one that has been executed first is to be performed. According to the second embodiment, therefore, the angle of the throttle valve 20 is changed to the angle needed for the homogeneous-charge combustion mode when the value of the throttle delay counter reaches the throttle delay decision value C1 acquired based on the engine speed NE and the engine load KL or when the value of the elapsed-time counter reaches the decision value Ce acquired from the actual angle of the EGR valve 16, whichever occurs first.

Figure 8:
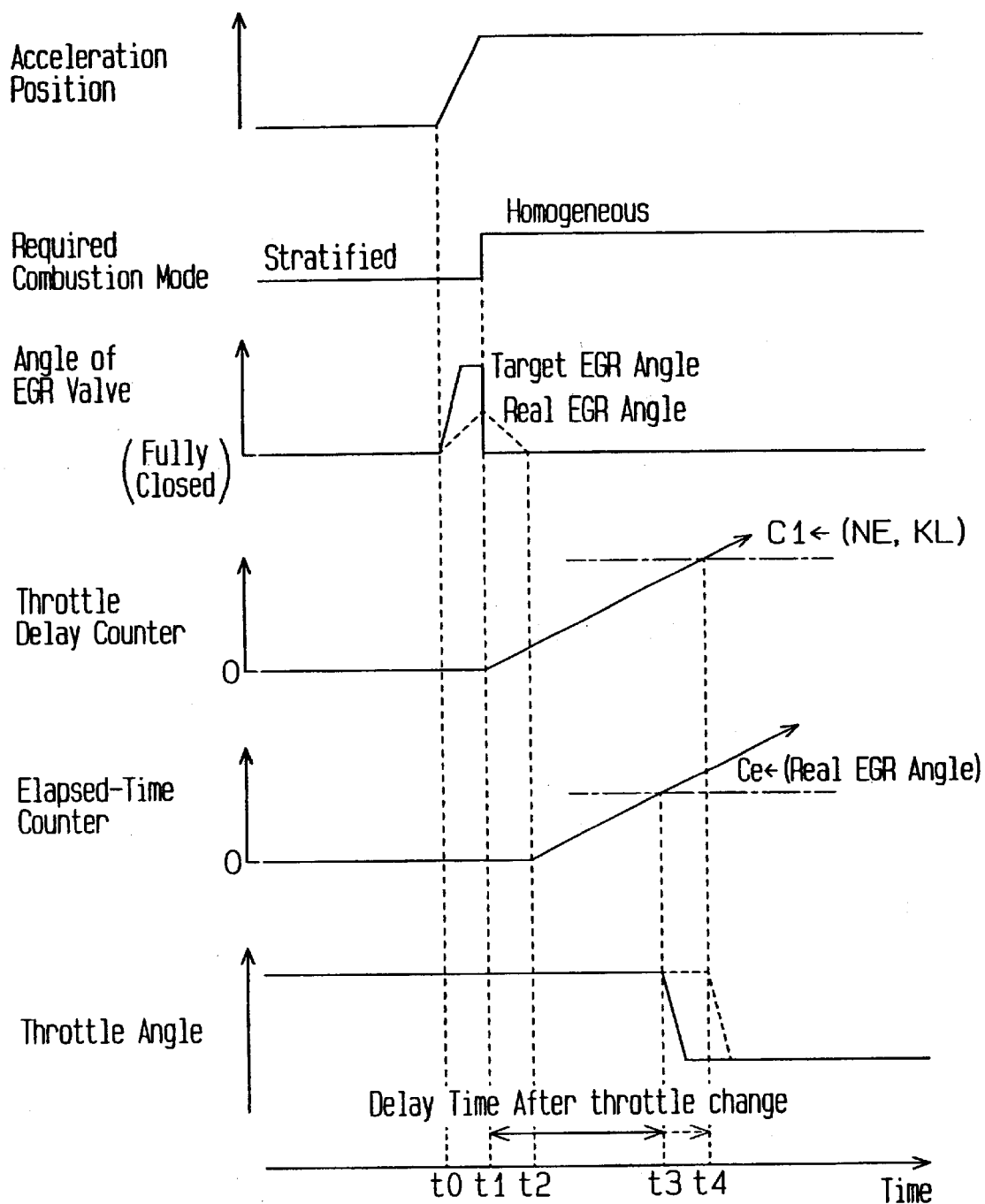
FIG. 8 is a timing chart for one example of combustion control according to the second embodiment.

FIG. 8 is a timing chart which exemplifies control for switching the combustion mode according to the second embodiment.

At time t0, the acceleration position is changed. Then, a target EGR angle or the required angle of the EGR valve 16 is changed. The actual angle of the EGR valve 16 follows up a change in target angle with a slight delay as indicated by the broken lines.

At time t1, a request is made to switch the stratified-charge combustion mode to the homogeneous-charge combustion mode, so that the target angle of the EGR valve 16 is changed to the angle needed for the homogeneous-charge combustion mode (the angle is fully closed in this embodiment). It is to be noted however that at time t1, the actual angle of the EGR valve 16 has not reached the required angle. The decision value Ce is computed in accordance with the actual angle of the EGR valve 16 at time t1. The counting operation of the throttle delay counter starts also at time t1.

After time t1, the actual angle of the EGR valve 16 changes toward the angle needed for the homogeneous-charge combustion mode (fully closed) in accordance with a change in target angle. At time t2, the actual angle of the EGR valve 16 reaches the angle needed for the homogeneous-charge combustion mode. The counting operation of the elapsed-time counter starts at time t2.

Thereafter, the ECU 27 stands by until the time when the value of the throttle delay counter reaches the throttle delay decision value C1 that is computed based on the engine speed NE and the engine load KL or the time when the count value reaches the decision value Ce that is computed in accordance with the actual angle of the EGR valve 16.

In the example of FIG. 8, the actual angle of the EGR valve 16 at the time (t1) when the request for switching the combustion mode has been made is sufficiently smaller than the target EGR angle (needed angle), the actual EGR-gas remaining time is shorter than the EGR-gas remaining time that is estimated from the engine speed NE and the engine load KL. Therefore, the delay time based on the actual angle of the EGR valve 16 or time t3 at which the value of the elapsed-time counter reaches the decision value Ce comes earlier than time t4 at which the value of the throttle delay counter reaches the throttle delay decision value C1. Thus, the throttle angle is changed to the angle needed for the homogeneous-charge combustion mode at time t3.

According to the second embodiment, the delay time is set based on the actual angle of the EGR valve 16 in addition to the engine speed NE and the engine load KL. Even when the needed angle of the EGR valve 16 differs from the actual angle of the EGR valve 16 at the time the combustion-mode switching request has been made, it is possible to accurately estimate the EGR-gas remaining time and set the adequate delay time accordingly.

The second embodiment has the following advantage in addition to the advantage (1) of the first embodiment.

(2) Even when the needed angle of the EGR valve 16 differs from the actual angle of the EGR valve 16 at the time the combustion-mode switching request has been made, the delay time needed to suppress the degradation of the drivability is set. This prevents degradation of the drivability and prevents the NOx emission from increasing or the stratified charge combustion noise from increasing.

The second embodiment may be modified as follows.

Instead of separately counting the values of the throttle delay counter and the elapsed-time counter to set the delay time, the throttle delay decision value C1 may be computed based on the engine speed NE and the engine load KL and the actual angle of the EGR valve 16 at the time the combustion-mode switching request has been made. Further, the throttle delay decision value C1 acquired based on the engine speed NE and the engine load KL may be adjusted in accordance with the actual angle of the EGR valve 16. The essential point is such that the same advantages of the second embodiment can be acquired by setting the delay time based on the actual angle of the EGR valve 16 as well as the engine speed NE and the engine load KL.

Third Embodiment

It is more difficult to detect the degradation of the drivability when the running state of the engine 10 is in a transient state (e.g., during acceleration) than in a steady running state such as during constant velocity driving. At the time of switching the combustion mode to the homogeneous-charge combustion mode, therefore, it is possible to make the delay time from the point of alteration of the angle of the EGR valve 16 to the point of switching the combustion mode shorter.

According to the third embodiment, the delay time is set shorter when the running state of the engine 10 is in a transient state than when it is in a steady running state. The greater the degree of the transient state (hereinafter referred to as "transient degree") $\theta$ is, the shorter the delay time is made.

The setting of the delay time according to the third embodiment will now be discussed in detail by referring to a delay-time correcting routine in FIG. 9. This routine is executed as a subroutine when the operation goes to step 20 in the control routine in FIG. 4.

When the operation proceeds to this delay-time correcting routine, the ECU 27 first checks in step 200 if the running state of the engine 10 is in a transient state. If it is not in a transient state (NO in step 200), the ECU 27 leaves this correcting routine. In this case, the delay time is set based on the engine speed NE and the engine load KL and the combustion mode is switched using that delay time.

If the engine's running state is in a transient state (YES in step 200), the ECU 27 computes an adjusting throttle delay decision value Ct1 in consideration of the degree of a change in the running state of the engine 10 (transient degree $\theta$) in step 201. Next, the ECU 27 computes an adjusting ignition-injection delay decision value Ct2 in consideration of the transient degree $\theta$ in step 202. The adjusting delay decision values Ct1 and Ct2 are set smaller than the delay decision values C1 and C2 which are acquired based only on the engine speed NE and the engine load KL and are set smaller as the transient degree $\theta$ gets larger.

The transient degree $\theta$ is acquired as follows.

Figure 10:
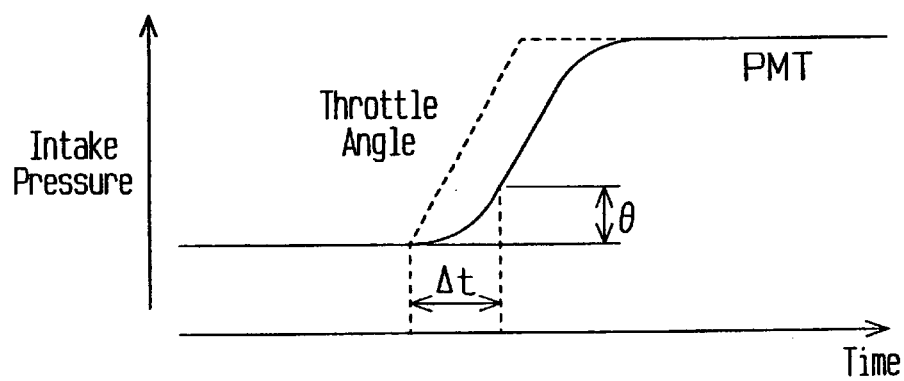
FIG. 10 is a timing chart showing changes in intake manifold pressure and time in the transient state in the combustion mode.

Even when the angle of the throttle valve 20 is changed, a change in the amount of air that is actually supplied into the combustion chamber 11a is delayed due to the movement of the air from the throttle valve 20 to the combustion chamber 11a, the inertia of the air and the like. To accurately determine the amount of air to be supplied into the combustion chamber 11a when this delayed response occurs, the ECU 27 computes an estimated value (PMT) of the pressure in the intake manifold in consideration of the influence of the delayed response, based on the transition of the throttle angle. Then, the ECU 27 computes the transient degree $\theta$ using the estimated pressure value PMT. Specifically, a change in estimated pressure value PMT per predetermined time $\Delta T$ is used as the transient degree $\theta$ as shown in FIG. 10.

After computing the adjusting delay decision values Ct1 and Ct2 in consideration of the transient degree $\theta$, the ECU 27 replaces the adjusting delay decision values Ct1 and Ct2 respectively with the delay decision values C1 and C2 associated with setting of the delay time in step 203 after which the ECU 27 leaves this routine. In other words, when the running state of the engine 10 is in a transient state, the delay time is set using the adjusting delay decision values Ct1 and Ct2 that reflect the transient degree $\theta$ in the third embodiment. Specifically, the delay time during a transient state is set shorter than it is in a steady running state. Further, the greater the transient degree $\theta$ is, the shorter the delay time is set.

Figure 11:
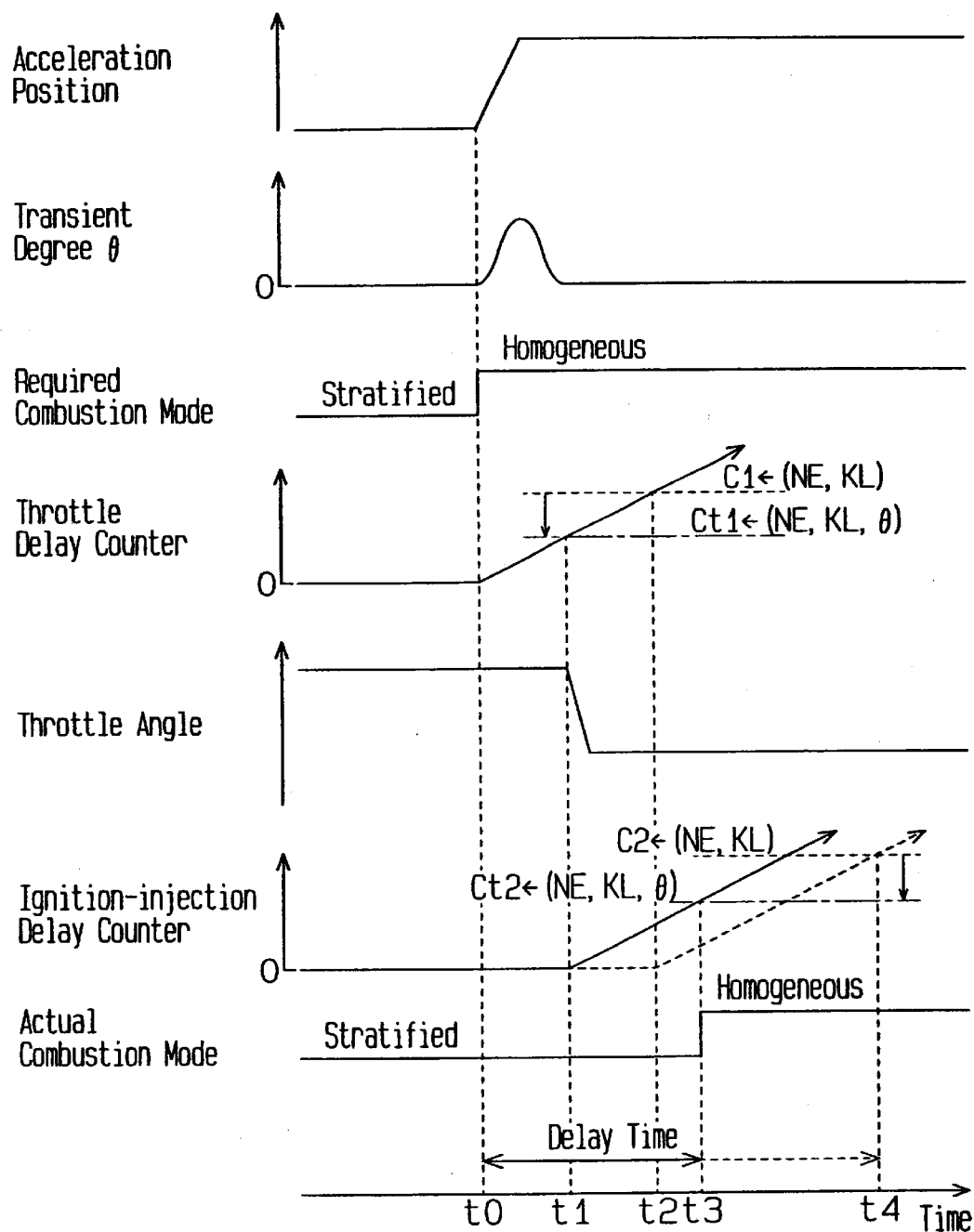
FIG. 11 is a timing chart for one example of combustion control according to the third embodiment.

FIG. 11 shows one example of combustion-mode switching control according to the third embodiment.

At time t0, the acceleration position is changed. The transient degree θ increases in response to this change. At time t0, a request for switching the stratified-charge combustion mode to the homogeneous-charge combustion mode is made. As a result, the angle of the EGR valve 16 starts changing to the angle needed for the homogeneous-charge combustion mode and the counting operation of the throttle delay counter starts.

At this time, the running state of the engine 10 is in a transient state. Therefore, the adjusting throttle delay decision value Ct1 is used as the delay decision value that determines the delay time to the point of alteration of the angle of the throttle valve 20. As a result, the angle of the throttle valve 20 is changed at time t1 earlier than time t2 at which the throttle delay counter reaches the throttle delay decision value C1. At time t1, the counting operation of the ignition-injection delay counter also starts.

Further, the adjusting ignition-injection delay decision value Ct2 is used as the delay decision value that determines the delay time to the point of switching the control mode of the ignition-injection system. At time t3, the value of the ignition-injection delay counter reaches the adjusting ignition-injection delay decision value Ct2. Then, the switching of the combustion mode is completed at time t3.

As apparent from the above, the delay time is shortened in accordance with the transient degree θ when the running state of the engine 10 is in a transient state. Consequently, the total delay time (times t0–t3) from the point of alteration of the angle of the EGR valve 16 to the point at which the switching of the combustion mode is completed is made shorter than the delay time when the engine's running state is a steady running state (times t0–t4).

In other words, when the running state of the engine 10 is in a transient state, an increase in the NOx emission and an increase in the stratified charge combustion noise that originate from the switching of the combustion mode are suppressed by the amount of the delay time shortened. While the shortened total delay time may increase a variation in torque at the time of switching the combustion mode, the variation or the degradation of the drivability is unlikely to be sensed by a passenger in a vehicle because of the running state of the engine 10 being in a transient state.

The third embodiment has the following advantages in addition to the advantage (1) of the first embodiment.

(3) When the running state of the engine 10 is in a transient state where the degradation of the drivability is unlikely to be sensed by a passenger in a vehicle, the delay time from the point of alteration of the angle of the EGR valve 16 to the angle needed for the homogeneous-charge combustion mode until the point of switching the combustion mode is set short. This effectively suppresses an increase in the NOx emission and an increase in the stratified charge combustion noise that originate from the switching of the combustion mode.

(4) The larger the transient degree θ is or the less likely it is to detect the degradation of the drivability, the shorter the delay time is set. This effectively suppresses an increase in the NOx emission and an increase in the stratified charge combustion noise that originate from the switching of the combustion mode.

The third embodiment may be modified as follows.

When the transient degree θ of the engine 10 is larger than a predetermined value, the delay time may be set to the same short time. The key point is that the above advantage (3) is acquired if the delay time when the running state of the engine 10 is in a transient state is set shorter than the one when the engine is running steadily.

Fourth Embodiment

When the engine 10 is coupled to the transmission gear 30 via the lock-up clutch 31a, the influence of a variation in the torque of the engine 10 on the drivability changes in accordance with the actuation state of the lock-up clutch 31a. When the lock-up clutch 31a is at the aforementioned slip position or release position, for example, the oil in the torque converter 31 absorbs a change in the torque generated in the engine 10 to some degree. Therefore, the degradation of the drivability is less likely to be sensed in this state than when the lock-up clutch 31a is at the engage position.

According to the fourth embodiment, therefore, the delay time is changed in accordance with the actuation state of the lock-up clutch 31a. More specifically, the delay time is set shorter when the lock-up clutch 31a is at the slip position or the release position than when it is at the engage position.

Figure 12:
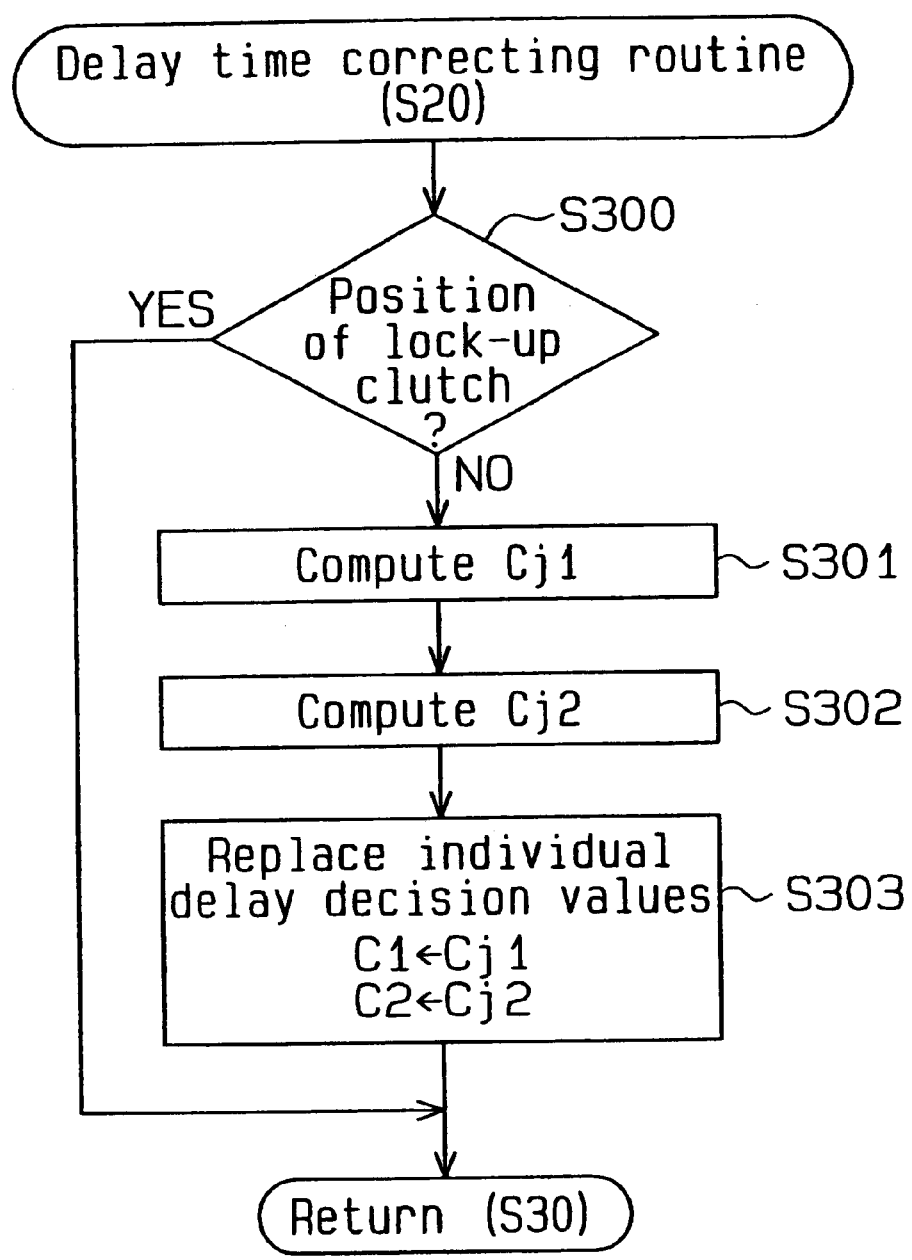
FIG. 12 is a flowchart of a delay-time correcting routine according to a fourth embodiment of this invention.

A delay-time correcting routine which is associated with setting of the delay time according to the fourth embodiment will be discussed below by referring to FIG. 12. This routine is executed as a subroutine in step 20 in the control routine in FIG. 4.

When the operation proceeds to this delay-time correcting routine, the ECU 27 first checks in step 300 if the lock-up clutch 31a is at the engage position. If the clutch 31a is at the engage position (YES in step 300), the ECU 27 leaves this correcting routine. In this case, at the time of switching the combustion mode, the delay time is set based only on the engine speed NE and the engine load KL.

If the lock-up clutch 31a is not at the engage position (NO in step 300), the operation goes to step 301. In steps 301 and 302, the ECU 27 respectively computes an adjusting throttle delay decision value Cj1 and an adjusting ignition-injection delay decision value Cj2 in consideration of the actuation state of the lock-up clutch 31a in addition to the engine speed NE and the engine load KL. In other words, the adjusting delay decision values Cj1 and Cj2 are set in consideration of the influence of the actuation state of the lock-up clutch 31a on the drivability. Specifically, when the lock-up clutch 31a is positioned at a position other than the engage position, the degradation of the drivability is unlikely to be detected so that the adjusting delay decision values Cj1 and Cj2 are set smaller than the delay decision values C1 and C2 that are computed in step 11 and 12 in FIG. 4.

In step 303, the ECU 27 updates the delay decision values C1 and C2 to the adjusting delay decision values Cj1 and Cj2. Then, the ECU 27 exits this routine. When the lock-up clutch 31a is at the slip position or the release position because of the updated delay decision values C1 and C2, the delay time is set shorter than when it is at the engage position.

Figure 13:
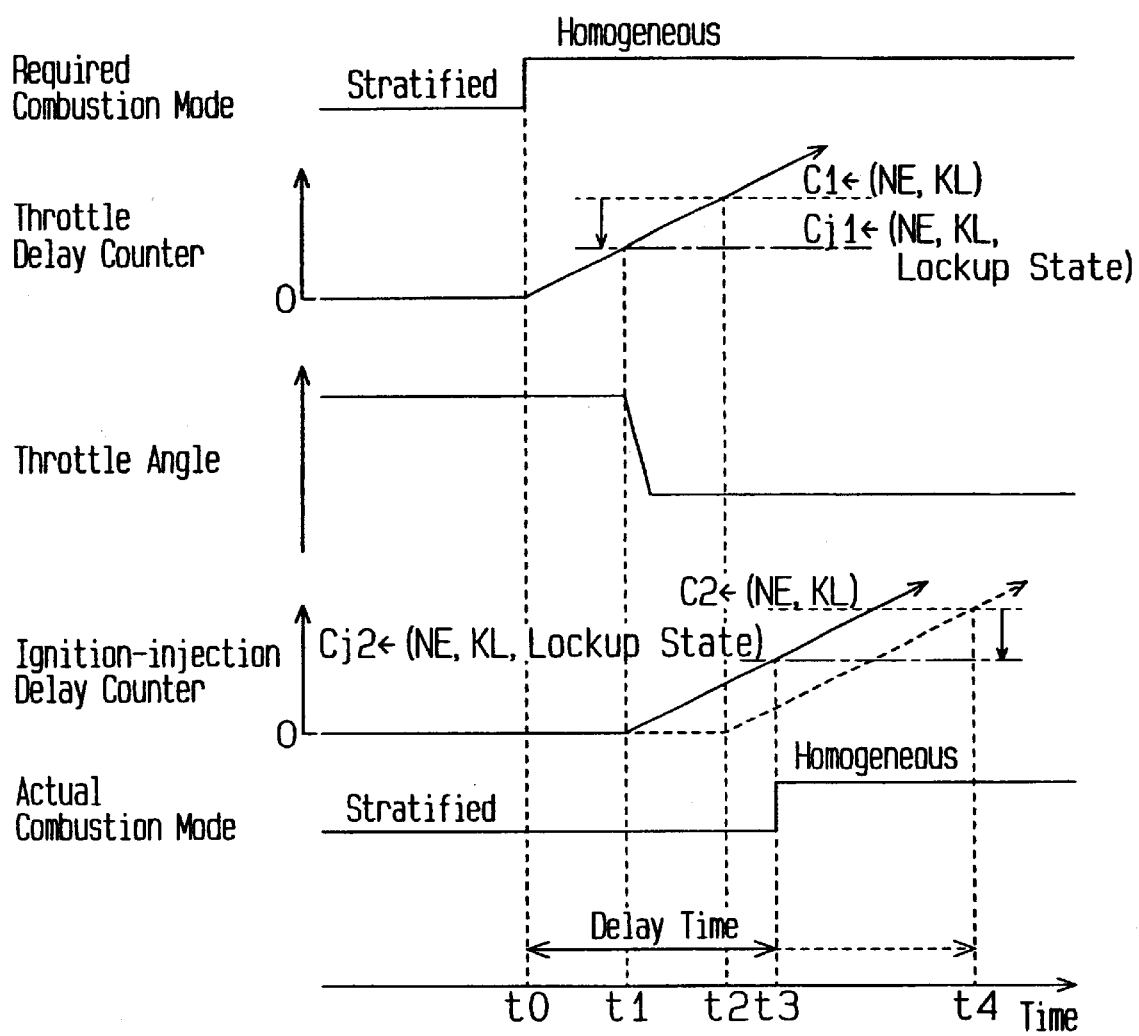
FIG. 13 is a timing chart for one example of combustion control according to the fourth embodiment.

FIG. 13 shows one example of combustion-mode switching control according to the fourth embodiment.

At time t0, the combustion-mode switching request is made. In response to this request, the angle of the EGR valve 16 is changed to the angle needed for the homogeneous-charge combustion mode and the counting operation of the throttle delay counter starts.

If the lock-up clutch 31a is at the slip position or the release position at time t0, the adjusting delay decision values Cj1 and Cj2 are used.

At time t1, the value of the throttle delay counter reaches the delay decision value Cj1. At time t1, the angle of the throttle valve 20 starts changing and the counting operation of the ignition-injection delay counter (d) starts. At time t3, the value of the ignition-injection delay counter reaches the delay decision value Cj2. At this time, the combustion mode is changed to the homogeneous-charge combustion mode.

If the lock-up clutch 31a is at the engage position at time t0, the delay decision values C1 and C2 based only on the engine speed NE and the engine load KL are used. In this case, the angle of the throttle valve 20 is changed at time t2 and the combustion mode is switched at time t4 as indicated by the imaginary lines.

The fourth embodiment has the following advantage in addition to the advantage (1) of the first embodiment.

(5) When the lock-up clutch 31a is located at the position where the degradation of the drivability is unlikely to be sensed by a passenger in a vehicle, delay decision values are set to make the delay time shorter. As a result, an increase in the NOx emission and an increase in the stratified charge combustion noise are suppressed by the amount of the shortened delay time. While the shortened total delay time may increase a variation in torque at the time of switching the combustion mode, this variation or the degradation of the drivability is unlikely to be sensed by a passenger in a vehicle because the lock-up clutch 31a is at the slip position or the release position, as per the third embodiment.

The fourth embodiment may be modified as follows.

The delay time may be set in accordance with the degree of engagement of the lock-up clutch 31a. Specifically, the delay time may be set shorter as the degree of engagement of the engine 10 with the transmission gear 30 is smaller. In this case, as the delay time is set more finely in accordance with the actuation state of the lock-up clutch 31a, an increase in the NOx emission and an increase in the stratified charge combustion noise are suppressed more effectively.

Fifth Embodiment

To regenerate a catalytic converter, the air-fuel ratio of the air-fuel mixture is temporarily changed richer than the stoichiometric air-fuel ratio. This is called "rich spike control". When the rich spike control is executed during the stratified-charge combustion mode, the combustion mode is temporarily changed to the homogeneous-charge combustion mode and the air-fuel ratio becomes richer than the stoichiometric air-fuel ratio.

In the homogeneous charge combustion with a rich air-fuel ratio, there is a high resistance to misfire. That is, it is less likely to cause excess-EGR originated misfire. In other words, when the air-fuel ratio is set to a rich side, misfire does not happen even if some EGR gas remains in the combustion chamber. In such a case, the drivability is insured even if the delay time needed to reduce the residual EGR gas is short. According to the fifth embodiment, therefore, the delay time is set short when the set air-fuel ratio in the homogeneous-charge combustion mode to which the combustion mode is to be switched is richer than the stoichiometric air-fuel ratio.

Figure 14:
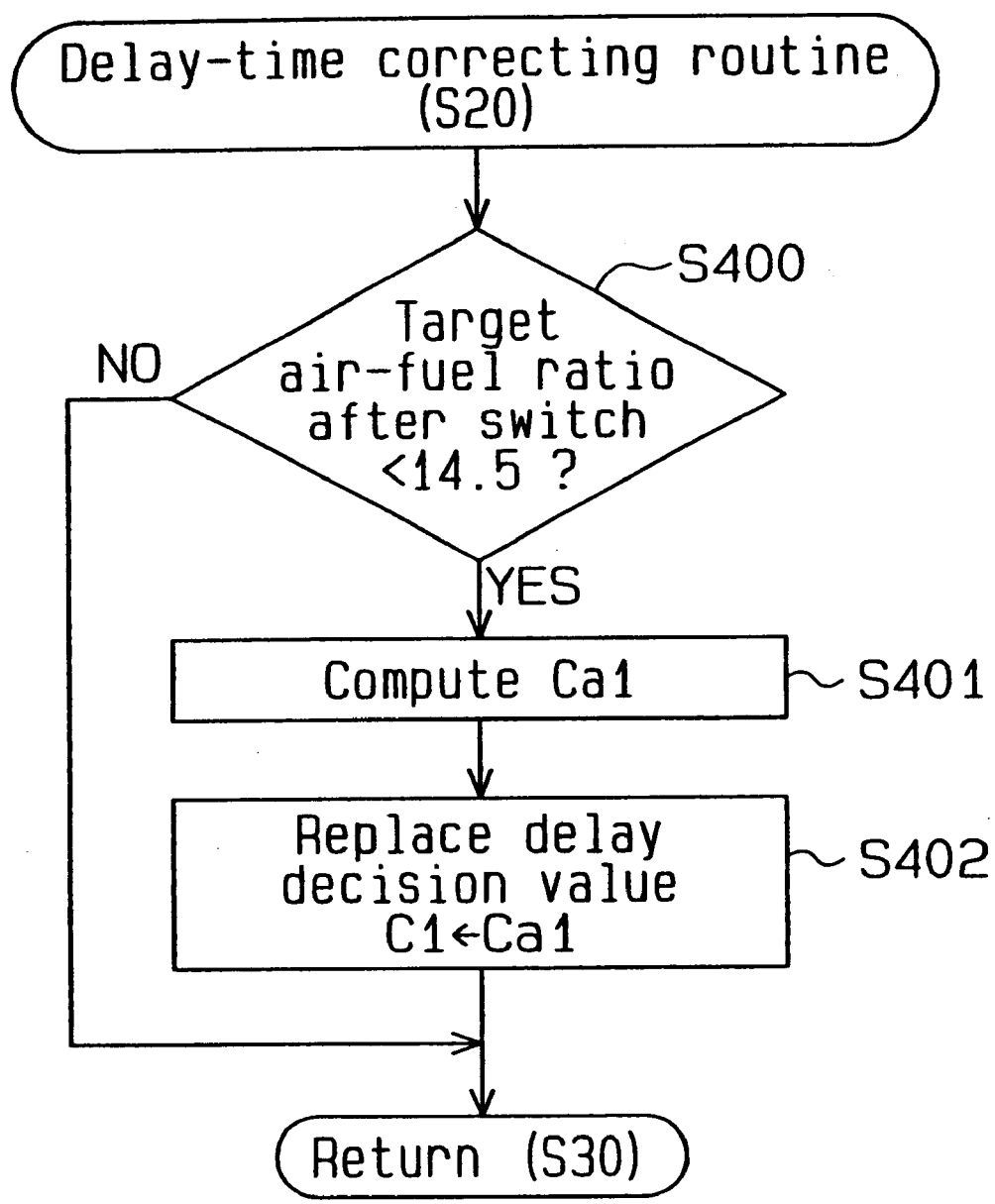
FIG. 14 is a flowchart of a delay-time correcting routine according to a fifth embodiment of this invention.

A routine of setting the delay time in the fifth embodiment will now be discussed by referring to a delay-time correcting routine in FIG. 14. This routine is executed as a subroutine when the operation proceeds to step 20 in the control routine in FIG. 4.

When the operation proceeds to this delay-time correcting routine, the ECU 27 first checks in step 400 if the set air-fuel ratio after switching of the combustion mode (target air-fuel ratio) is smaller than 14.5 or the stoichiometric air-fuel ratio. If the target air-fuel ratio is smaller or leaner than the stoichiometric air-fuel ratio (NO in step 400), the operation goes to step 30 in FIG. 4. In this case, the delay time is set based only on the engine speed NE and the engine load KL and the combustion mode is switched in accordance with that delay time.

If the target air-fuel ratio is richer than the stoichiometric air-fuel ratio (YES in step 400), in step 401, the ECU 27 computes a rich throttle delay decision value Ca1 in consideration of the engine speed NE and the engine load KL and the influence of the set air-fuel ratio (A/F) after the mode switching on the drivability. The rich delay decision value Ca1 is smaller than the throttle delay decision value C1 that is acquired based only on the engine speed NE and the engine load KL.

In step 402, the ECU 27 updates the throttle delay decision value C1 that is to be actually used to the rich delay decision value Ca1 and then leaves this routine.

Figure 15:
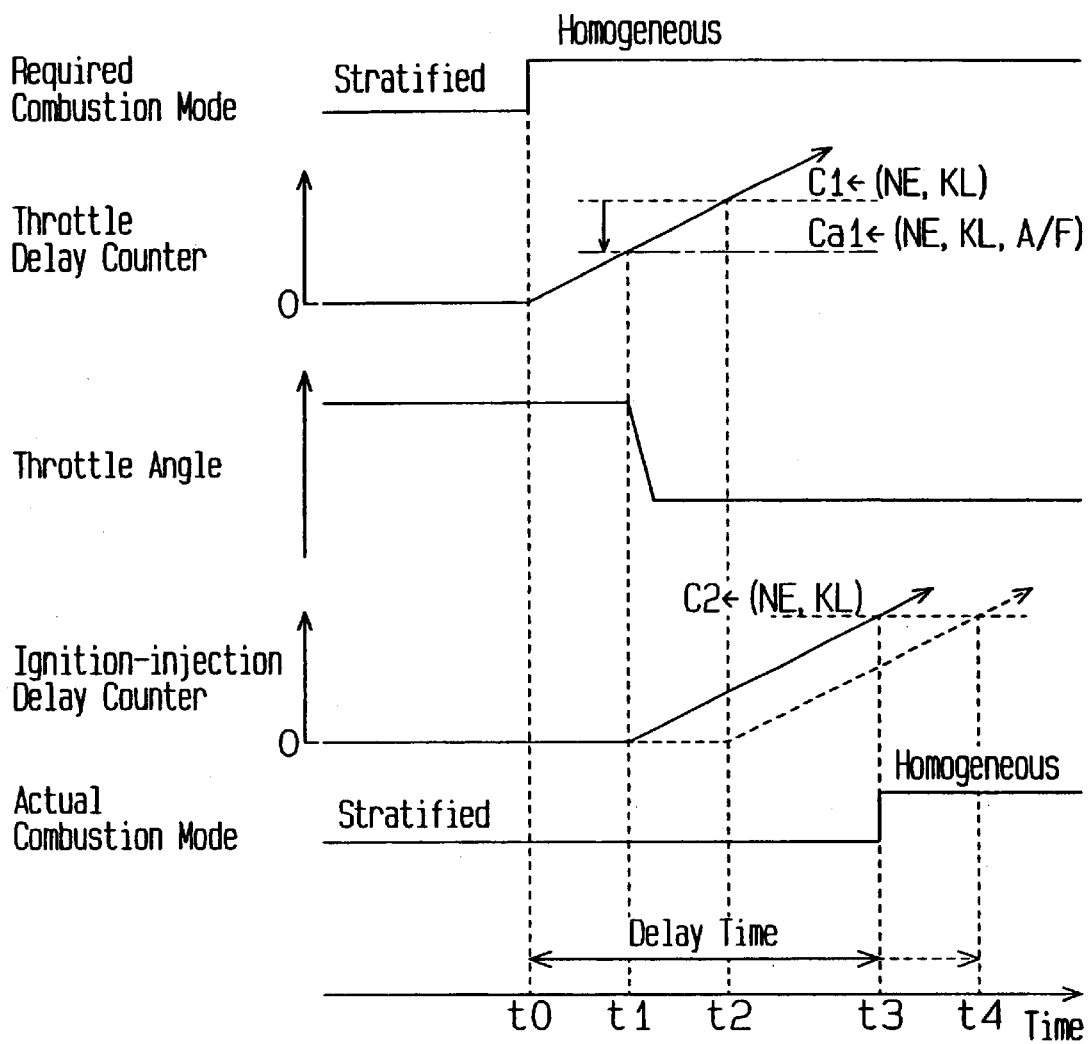
FIG. 15 is a timing chart for one example of combustion control according to the fifth embodiment.

FIG. 15 shows one example of combustion-mode switching control according to the fifth embodiment.

When the combustion-mode switching request is made at time t0, the angle of the EGR valve 16 starts changing and the counting operation of the throttle delay counter starts.

If the target air-fuel ratio after mode switching is richer than the stoichiometric air-fuel ratio, the delay decision value Ca1 which is acquired in consideration of the set air-fuel ratio after mode switching is used.

At time t1, the value of the throttle delay counter reaches the delay decision value Ca1. Then, the angle of the throttle valve 20 is changed to the angle needed for the homogeneous-charge combustion mode and the counting operation of the ignition-injection delay counter starts. At time t3, the value of the ignition-injection delay counter reaches the ignition-injection delay decision value C2 and the combustion mode is switched.

If the target air-fuel ratio after mode switching is leaner than the stoichiometric air-fuel ratio at time t0, on the other hand, the angle of the throttle valve 20 is changed at time t2 at which the value of the throttle delay counter reaches the throttle delay decision value C1 which is computed based only on the engine speed NE and the engine load KL. Therefore, the combustion mode is switched at time t4 later than time t3.

The fifth embodiment has the following advantage in addition to the advantage (1) of the first embodiment.

(6) When the set air-fuel ratio after mode switching is richer than the stoichiometric air-fuel ratio, the delay time is set short. This suppresses an increase in the NOx emission and an increase in the stratified charge combustion noise by the amount of the shortened delay time.

Sixth Embodiment

Figure 16:
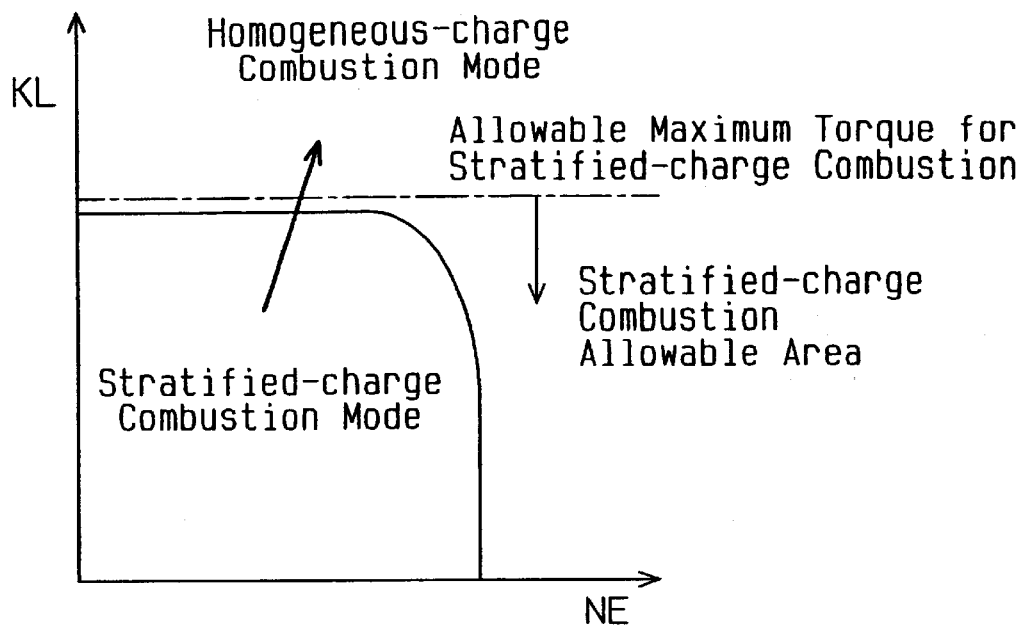
FIG. 16 is a drive-areas map that illustrates the transition of the running state of the engine during combustion mode switching.

The combustion mode of the engine 10 is normally set as shown in FIG. 16. The stratified-charge combustion mode is carried out in the light-load/low-speed area, and the homogeneous-charge combustion mode is carried out outside this area. The area of the homogeneous-charge combustion mode is set within an area of the allowable maximum torque for adequate stratified charge combustion (the stratified-charge-combustion allowable area) in the map in FIG. 16.

When the delay time is set as done in the first to fifth embodiments at the time of switching the combustion mode, the following situation may occur. For example, a request for switching the combustion mode to the homogeneous-charge combustion mode may be issued when the running state of the engine is in the area of the stratified-charge combustion mode in the vicinity of the mode boundary. As the load of the engine 10 becomes higher during the delay time, the torque becomes greater than the allowable maximum torque for stratified charge combustion before mode switching to the homogeneous-charge combustion mode is completed. In this case where good combustion cannot be maintained, stratified charge combustion continues until mode switching is completed.

In such a heavy-load running state, however, the degradation of the drivability is unlikely to be sensed. According to the sixth embodiment, when the engine load reaches a heavy-load area equal to or above the allowable maximum torque for stratified charge combustion during mode switching to the homogeneous-charge combustion mode from the stratified-charge combustion mode, the combustion mode is forcibly switched even before the delay time elapses.

Figure 17:
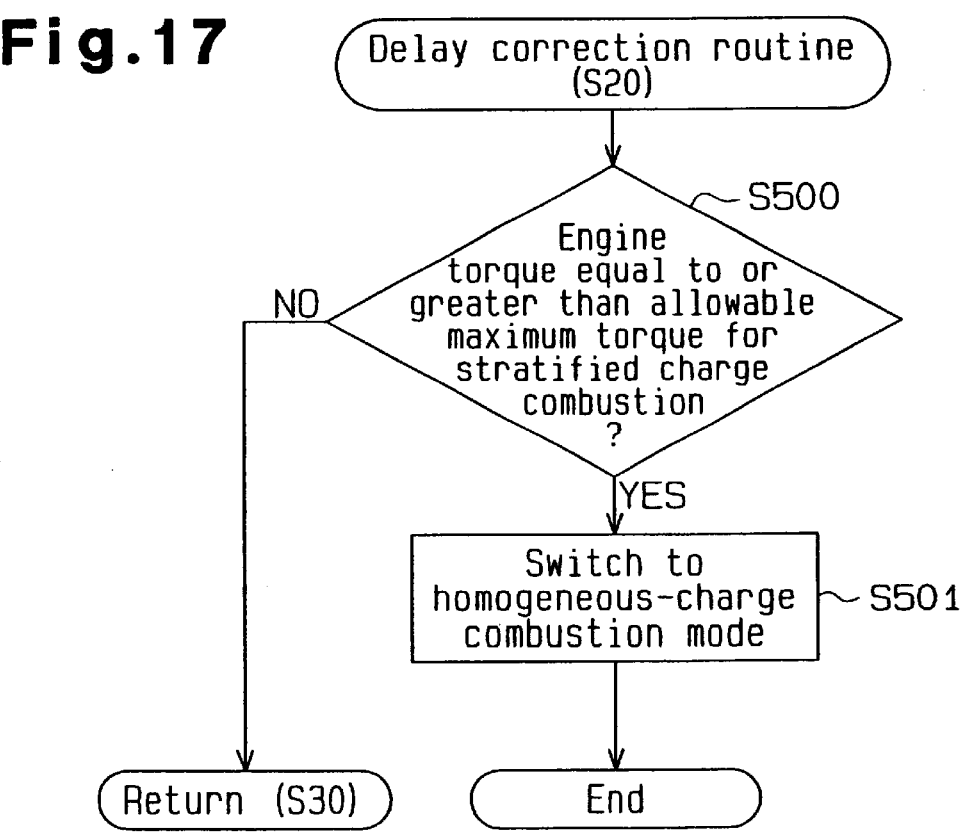
FIG. 17 is a flowchart of a delay-time correcting routine according to a sixth embodiment of this invention.

A delay-time correcting routine according to the sixth embodiment will now be discussed by referring to a flowchart in FIG. 17. This routine is executed as a subroutine when the operation proceeds to step 20 in the switching control routine in FIG. 4.

First, the ECU 27 checks in step 500 if the torque of the engine 10 is equal to or greater than the allowable maximum torque for stratified charge combustion. When the engine torque is smaller than the allowable maximum torque (NO in step 500), the operation leaves this routine. In this case, the delay time is set based on the engine speed NE and the engine load KL.

If the torque of the engine 10 is equal to or greater than the allowable maximum torque (YES in step 500), the ECU 27 forcibly switches the combustion mode to the homogeneous-charge combustion mode in step 501 regardless of the time elapsed since the alteration of the angle of the EGR valve 16.

Figure 18:
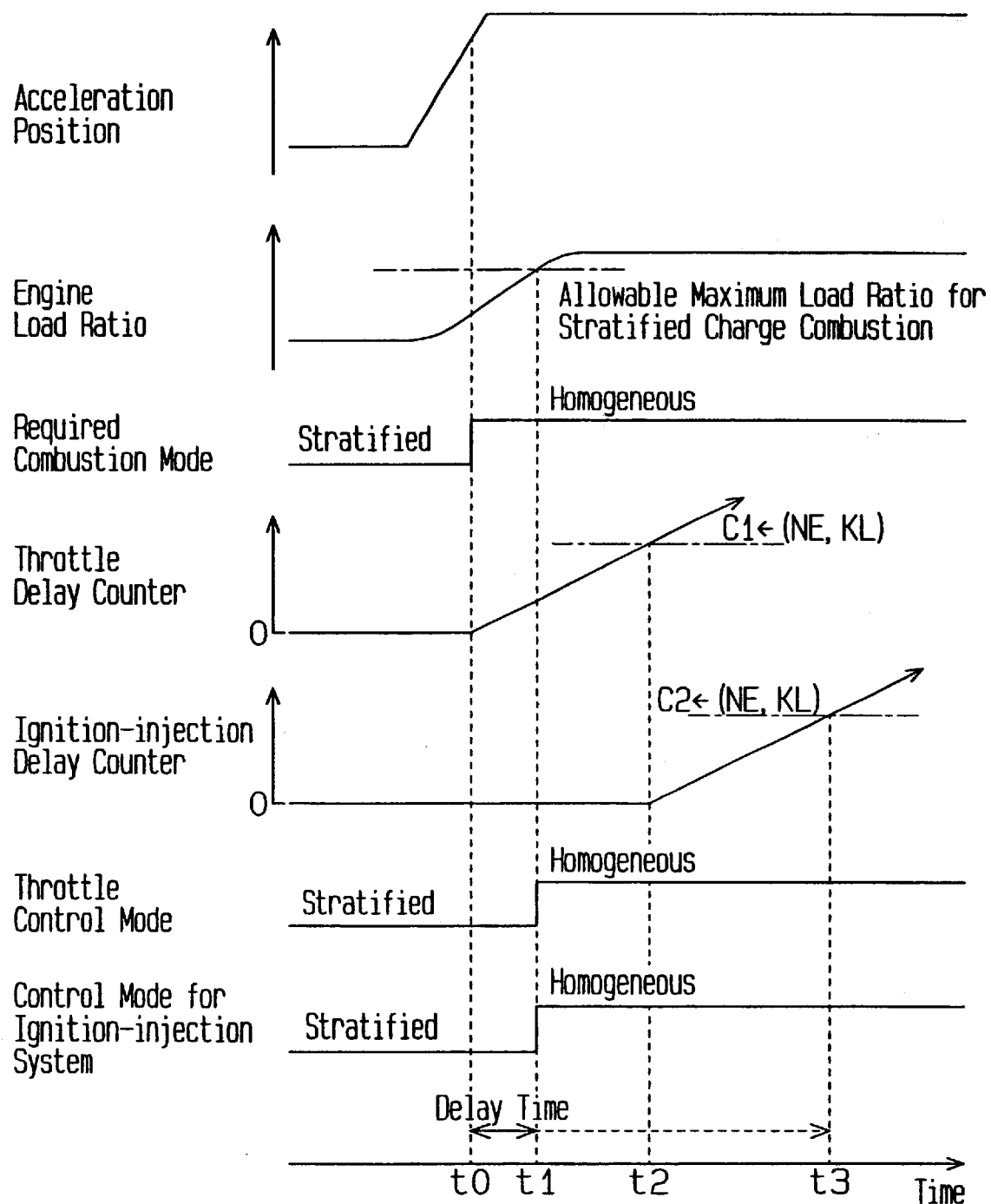
FIG. 18 is a timing chart for one example of combustion control according to the sixth embodiment.

FIG. 18 shows one example of combustion-mode switching control according to the sixth embodiment.

The load ratio of the engine 10 changes in accordance with a change in acceleration position. At time t0, a request for switching the combustion mode is made. Normally, the combustion mode is switched as follows.

At time t0, the counting operation of the throttle delay counter starts. At time t2, the value of the throttle delay counter reaches the throttle delay decision value C1. As a result, the angle of the throttle valve 20 is changed to the angle needed for the homogeneous-charge combustion mode. That is, the throttle control mode is switched to the homogeneous-charge combustion mode. At time t2, the counting operation of the ignition-injection delay counter starts. At time t3, the value of the ignition-injection delay counter reaches the ignition-injection delay decision value C2 and the combustion mode is switched. At this time, the control mode for the ignition-injection system is switched to the homogeneous-charge combustion mode.

If the torque of the engine 10 becomes greater than the allowable maximum torque for stratified charge combustion (allowable maximum load ratio) during mode switching (time t1), the throttle control mode and the control mode for the ignition-injection system are immediately switched to the homogeneous-charge combustion mode at that time t1.

The sixth embodiment has the following advantages in addition to the advantage (1) of the first embodiment.

(7) When it becomes hard to sense the degradation of the drivability during mode switching, the combustion mode is switched before the delay time elapses, thus shortening the delay time. Further, an increase in the NOx emission and an increase in the stratified charge combustion noise caused by the mode switch are effectively prevented.

(8) It is possible to reliably inhibit the stratified charge combustion from continuing under an inadequate condition such as a heavy-load area beyond the allowable maximum torque for stratified charge combustion.

The sixth embodiment may be modified as follows.

The allowable maximum torque (allowable maximum load ratio) can be changed arbitrarily as long as the degradation of the drivability becomes unlikely to be sensed above that torque range.

Seventh Embodiment

When the engine 10 is running with a light load as in an idling state, the output torque is low so that a passenger feels uncomfortable even if a light torque change occurs. It is therefore desirable that the combustion mode which causes a torque change should be restricted as much as possible in a light-load state. In a combustion control apparatus according to the seventh embodiment, a switching inhibition area for inhibiting the switching of the combustion mode is set as shown in FIG. 19.

Figure 19:
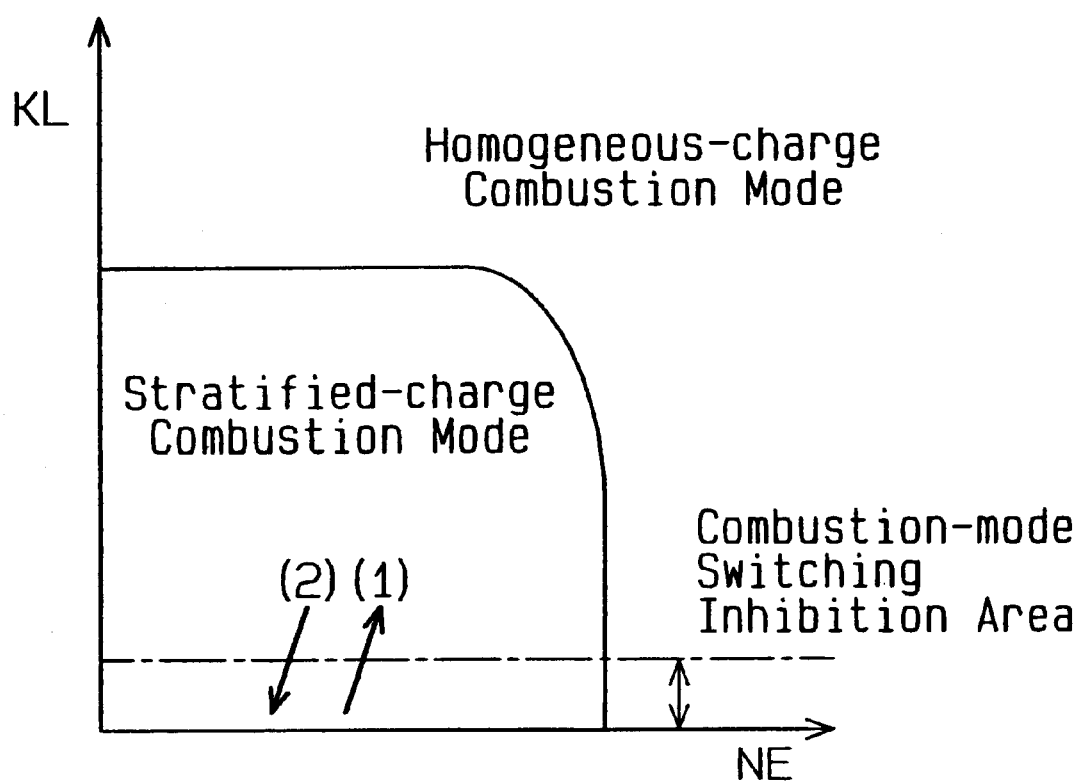
FIG. 19 is a drive-areas map that illustrates the transition of the running state of the engine during combustion mode switching.

When the delay time is set as done in the first to sixth embodiments at the time of switching the combustion mode, the running state of the engine 10 may come in and out the switching inhibition area as indicated by arrows (1) and (2) in FIG. 19 during the period from the point when a request for switching the combustion mode has been made to the point when switching to the homogeneous-charge combustion mode is completed. According to the seventh embodiment, switching of the combustion mode is permitted/inhibited when entering/leaving the switching inhibition area is predicted.

In an area (near boundary area) located slightly on the heavy-load side to the switching inhibition area, a large amount of EGR gas is not supplied even in the stratified-charge combustion mode so that there is not a large difference between the required angles of the EGR valve 16 between the two combustion modes. Neither is there a large difference between the required angles of the throttle valve 20 between the two combustion modes. Therefore, combustion-mode switching in the near boundary area hardly degrades the drivability. The situation where the running state of the engine 10 deviates from the switching inhibition area is when the running state of the engine 10 is in a transient state where the degradation of the drivability is unlikely to be sensed. According to the seventh embodiment, therefore, the combustion mode is immediately switched to the homogeneous-charge combustion mode when deviation from the combustion-mode switching inhibition area is predicted and when a combustion-mode switching request has been made.

Figure 20:
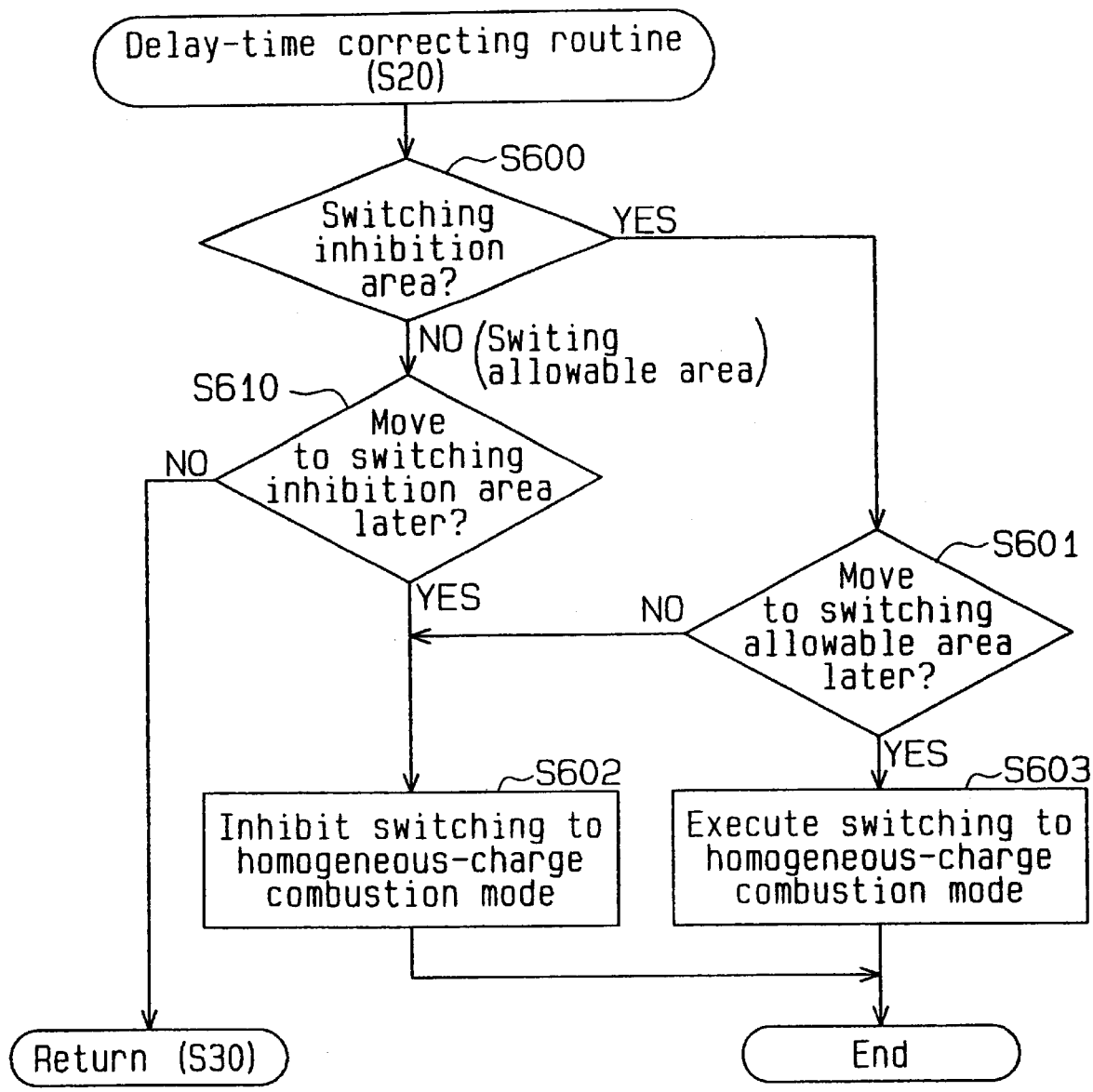
FIG. 20 is a flowchart of a delay-time correcting routine according to a seventh embodiment of this invention.

A delay-time correcting routine according to the seventh embodiment will now be discussed specifically by referring to a flowchart in FIG. 20. This routine is executed as a subroutine when the operation goes to step 20 in the control routine in FIG. 4.

In the first step 600, the ECU 27 checks if the running state of the engine 10 lies in the switching inhibition area. If the running state of the engine 10 lies in the switching inhibition area (YES in step 600), the operation goes to step 601 where the ECU 27 determines whether or not it is predicted that the engine's running state will soon move to a switching allowable area where combustion-mode switching is allowable. This possibility of the shifting of the engine's running state is determined based on the transition of the throttle angle (the target angle of the throttle valve 20). Specifically, if the throttle angle exceeds a predetermined angle, it is determined that the output torque of the engine 10 will increase and comes off the switching inhibition area soon.

If it is not determined that the transition to the switching allowable area occurs soon, i.e., if the running state of the engine 10 stays in the switching inhibition area for a while (NO in step 601), the ECU 27 inhibits switching to the homogeneous-charge combustion mode in step 602. Thereafter, the ECU 27 temporarily terminates this routine.

If it is determined that the running state of the engine 10 currently lies in the switching inhibition area but the transition to the switching allowable area occurs soon (YES in step 601), the ECU 27 immediately switches the combustion mode to the homogeneous-charge combustion mode in step 603. Thereafter, the ECU 27 temporarily terminates this routine.

If the running state of the engine 10 is not in the switching inhibition area when the flow goes to this routine (NO in step 600), the flow moves to step 610.

In step 610, the ECU 27 determines whether or not it is predictable that the running state of the engine 10, which is currently in the switching allowable area, will be shifted to the switching inhibition area soon. This decision on the transition to the switching inhibition area is also made from the transition of the angle of the throttle valve 20 to the target angle. Specifically, when the angle of the throttle valve 20 is reduced further from a predetermined angle, it is determined that the output torque of the engine 10 will decrease and reach the switching inhibition area soon.

If it is determined that the running state of the engine 10 will reach the switching inhibition area soon (YES in step 610), the ECU 27 inhibits switching to the homogeneous-charge combustion mode and then temporarily terminates this routine.

If it is determined that the running state of the engine 10 will stay in the switching allowable area for a predetermined time (NO in step 610), the ECU 27 exits this routine. In this case, the delay time is set based on the engine speed NE and the engine load KL as mentioned earlier, and the combustion mode is switched according to the delay time.

Figure 21:
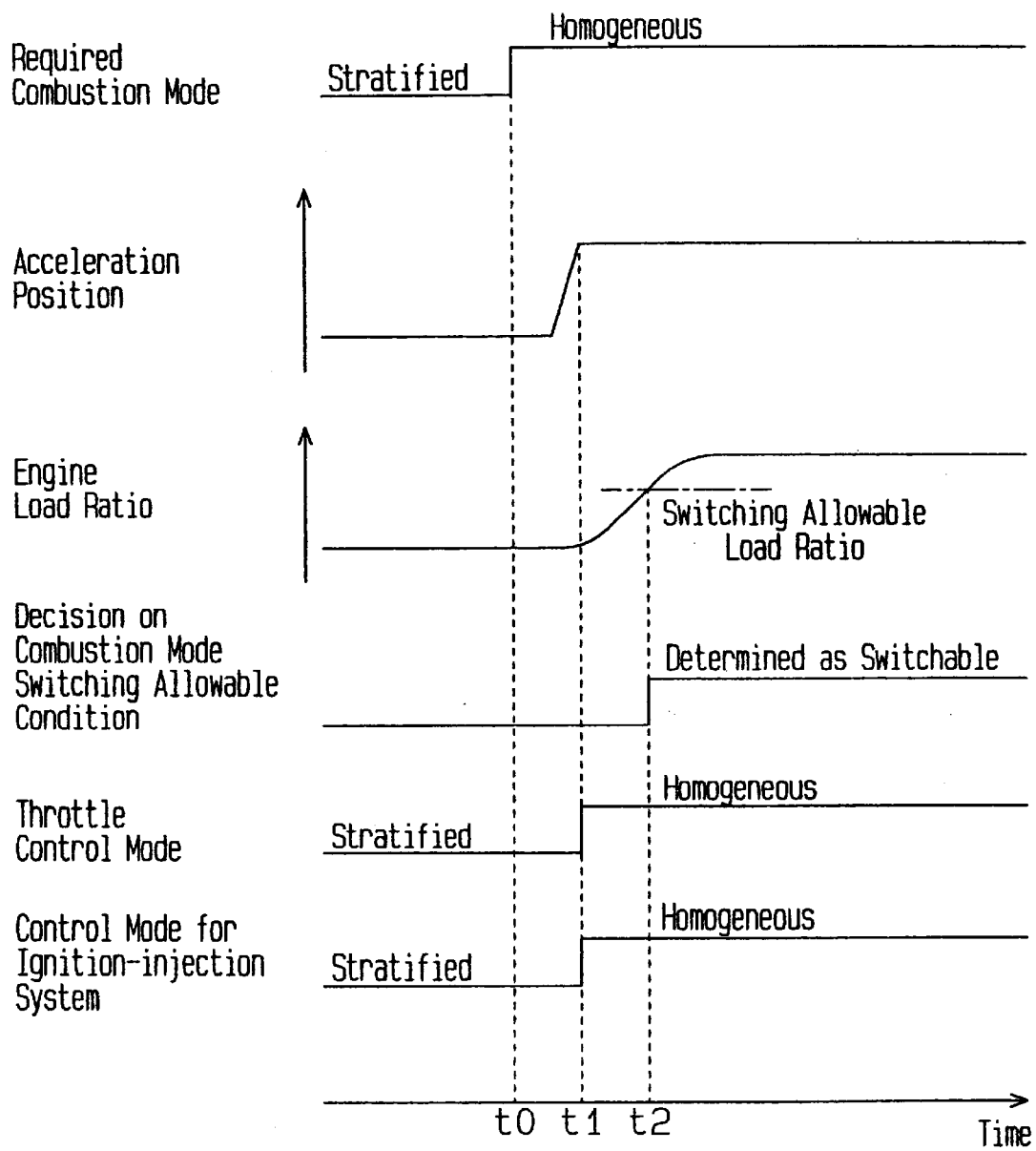
FIGS. 21 and 22 are timing charts for examples of combustion control according to the seventh embodiment.
Figure 22:
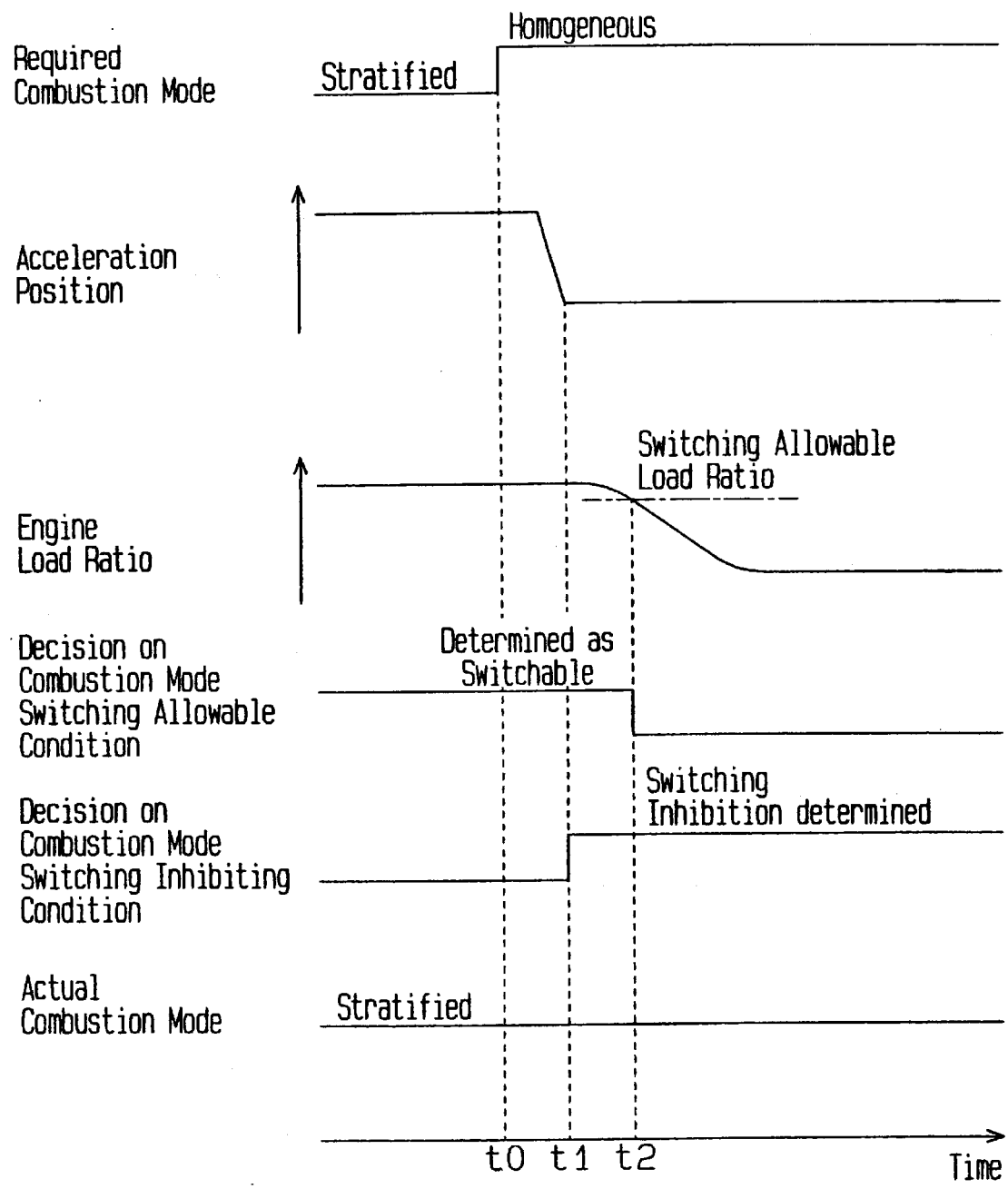

FIGS. 21 and 22 exemplify combustion-mode switching control according to the seventh embodiment. In the timing chart in FIG. 21, the running state of the engine 10 is shifted to the switching allowable area from the switching inhibition area during mode switching from the stratified-charge combustion mode to the homogeneous-charge combustion mode.

At time t0 in FIG. 21, the combustion-mode switching request is made. If the running state of the engine 10 then is in the switching inhibition area, switching of the combustion mode is prohibited so that no substantial process associated with the mode switching will take place.

If the acceleration position is changed to a certain level, the output torque of the engine 10 gradually increases. At time t2, the engine load ratio rises above the switching allowable load ratio. At this time, the running state of the engine 10 is shifted to the switching allowable area from the switching inhibition area. A decision on the switching allowable condition is then made.

According to the seventh embodiment, switching to the homogeneous-charge combustion mode is carried out before the decision on the switching allowable condition is made. That is, it is predicted at time t1, prior to time t2, that the load will increase to the switching allowable area based on the transition of the throttle angle, and the throttle control mode and the control mode for the ignition-injection system are immediately switched to the homogeneous-charge combustion mode.

As the switching of the combustion mode is permitted before the decision on the switching allowable condition is made (time t1), the restriction on the switching of the combustion mode is reduced, thus increasing the degree of freedom of the combustion control of the engine 10.

If a mode-switching request is made when the transition to the switching allowable area from the switching inhibition area is predicted, there is no possibility of the degradation of the drivability so that the combustion mode is switched to the homogeneous-charge combustion mode instantaneously. This shortens the period for switching the combustion mode and thus effectively suppresses an increase in the NOx emission and an increase in the stratified charge combustion noise.

In the timing chart in FIG. 22, the running state of the engine 10 is shifted from the switching allowable area to the switching inhibition area during mode switching from the stratified-charge combustion mode to the homogeneous-charge combustion mode.

At time t0 in FIG. 22, the combustion-mode switching request is made. If the running state of the engine 10 is in the switching allowable area at time t0, a process of switching the combustion mode start.

In FIG. 22, the acceleration position is reduced and the engine load ratio falls below the switching allowable load ratio. As a result, a decision on the switching allowable condition at time t2 becomes invalid.

According to the seventh embodiment, however, switching to the homogeneous-charge combustion mode is prohibited before the decision on the switching allowable condition becomes invalid. That is, at time t1 before time t2 at which the running state of the engine 10 is shifted to the switching inhibition area, it is predicted that the load will go down to the switching inhibition area based on the transition of the throttle angle and the decision on the switching inhibition condition is made immediately. As a result, switching to the homogeneous-charge combustion mode is inhibited. Even though a request for switching the combustion mode has been issued, therefore, the actual combustion mode is not switched to the homogeneous-charge combustion mode.

The combustion control apparatus of the seventh embodiment inhibits switching to the homogeneous-charge combustion mode when the transition from the switching allowable area to the switching inhibition area is predicted. This reliably prevents switching of the combustion mode in the switching inhibition area where the degradation of the drivability is likely to be sensed.

As apparent from the above, the seventh embodiment has the following advantages in addition to the advantage (1) of the first embodiment.

(9) When the load of the engine 10 is in a predetermined light-load area (switching inhibition area), switching to the homogeneous-charge combustion mode from the stratified-charge combustion mode is prohibited. This prevents the drivability from being reduced by the switching of the combustion mode in the light-load area where the degradation of the drivability is likely to be detected.

(10) When it is predicted that the load of the engine 10 will be shifted to the switching inhibition area, switching to the homogeneous-charge combustion mode from the stratified-charge combustion mode is prohibited. This prevents the drivability from being reduced by the switching of the combustion mode in the light-load area.

(11) When it is predicted that the load of the engine 10 will deviate from the switching inhibition area, switching to the homogeneous-charge combustion mode from the stratified-charge combustion mode is permitted. This reduces the restriction on the switching of the combustion mode, thus increasing the degree of freedom on the combustion control of the engine 10.

(12) If a request to change the combustion mode to the homogeneous-charge combustion mode is made when it is predicted that the running state of the engine 10 will deviate from the switching inhibition area, the combustion mode is switched immediately before the delay time elapses. In this case, the difference between the required angles of the EGR valve 16 between the two combustion modes is small and so is the difference between the required angles of the throttle valve 20 between the two combustion modes. This suppresses the degradation of the drivability and restrains the period for switching the combustion mode from becoming unnecessarily longer. As a result, an increase in the NOx emission and an increase in the stratified charge combustion noise are reduced.

The seventh embodiment may be modified as follows.

The stratified-charge combustion mode may be changed to the homogeneous-charge combustion mode when deviation of the running state of the engine 10 from the switching inhibition area is predicted. In this case, the advantage (11) is acquired regardless of mode switching to the homogeneous-charge combustion mode.

One of predictive control to inhibit switching to the homogeneous-charge combustion mode when the transition to the switching inhibition area is predicted and predictive control to allow switching to the homogeneous-charge combustion mode when the deviation from the switching inhibition area is predicted may be carried out.

A change in the load of the engine 10 may be determined or predicted in accordance with a parameter different from the transition of the angle of the throttle valve 20.

Eighth Embodiment

Although stratified charge combustion is carried out in the delay time in the process of switching the stratified-charge combustion mode to the homogeneous-charge combustion mode, the angle of the throttle valve 20 is reduced in accordance with the angle needed for the homogeneous-charge combustion mode. Therefore, the pumping loss is large so that the output torque of the engine 10 may drop temporarily.

A combustion control apparatus according to the eighth embodiment is designed to increase the fuel injection amount to supplement the amount of the output torque that has been reduced by the pumping loss.

Figure 23:
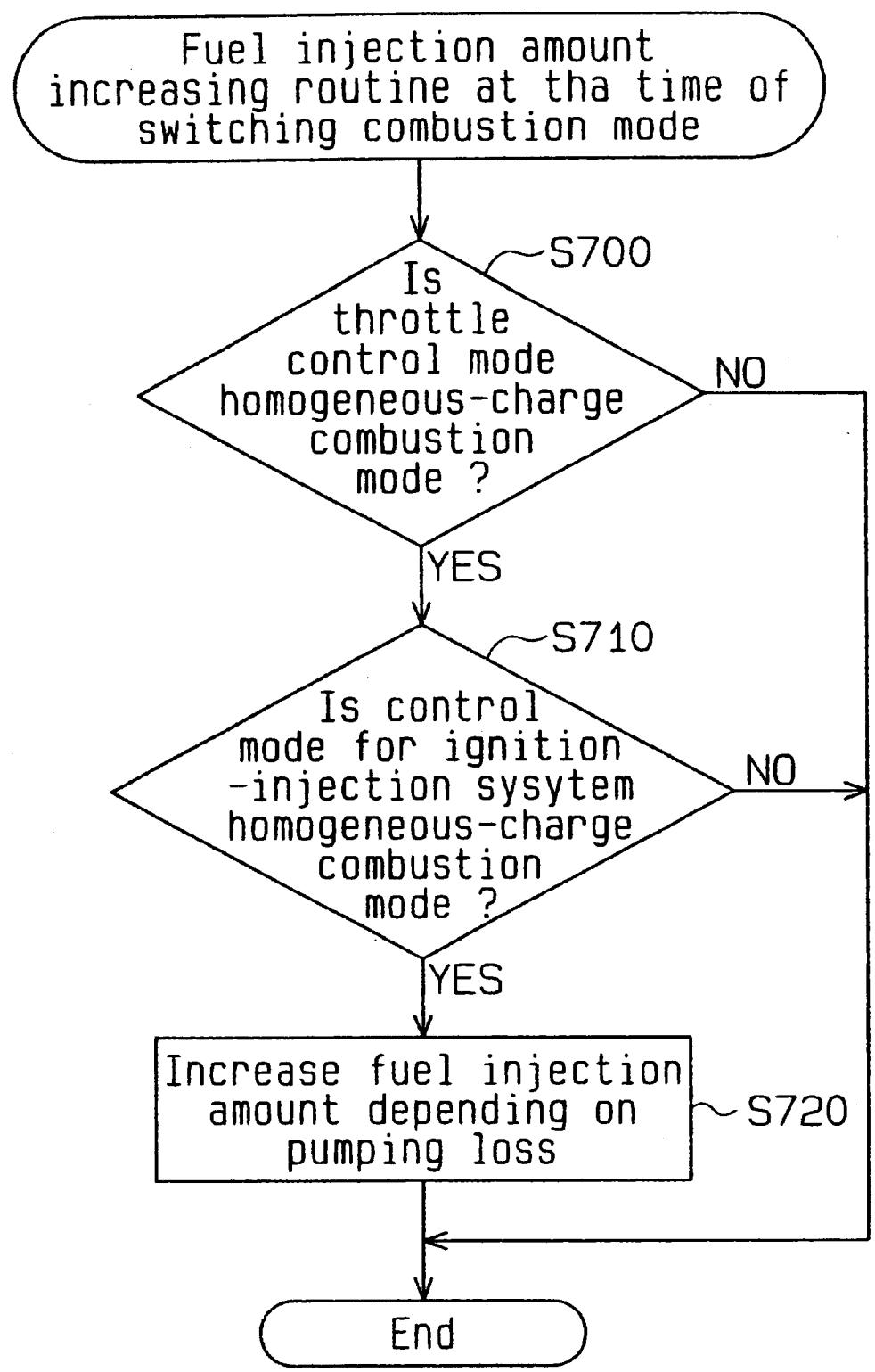
FIG. 23 is a flowchart of a fuel-injection-amount increasing routine at the time of switching the combustion mode according to an eighth embodiment of this invention.

A fuel-injection-amount increasing routine according to the eighth embodiment will specifically be discussed below by referring to a flowchart in FIG. 23. This routine is periodically executed in parallel to the control routine in FIG. 4 as an interrupt routine that is carried at predetermined intervals.

When the operation proceeds to this routine, the ECU 27 first determines in step 700 whether the throttle control mode is the homogeneous-charge combustion mode. In step 710, the ECU 27 determines if the control mode for the ignition-injection system is the homogeneous-charge combustion mode. That is, it is determined in steps 700 and 710 whether or not the present processing stage lies in the delay time from the point of alteration of the angle of the throttle valve 20 to the point of switching the control mode for the ignition-injection system.

If the present processing stage is not in the delay time, a negative decision (NO) is made in either step 700 or step 710. In this case, this routine is temporarily terminated. If the present processing stage is actually in the delay time, on the other hand, a positive decision (YES) is made in both step 700 and step 710. In this case, the operation proceeds to step 720.

In step 720, the ECU 27 increases the fuel injection amount. The amount of an increase is computed in accordance with the difference between the intake manifold pressure before the alteration of the angle of the throttle valve 20 and the present pressure in the intake manifold. The greater this differential pressure is, the larger the amount of an increase is set. This increase in the fuel injection amount compensates for a reduction in the output torque of the engine 10 induced by the pumping loss that is produced as the angle of the throttle valve 20 is reduced in accordance with the angle needed for the homogeneous-charge combustion mode. After the fuel injection amount is corrected, this routine is temporarily terminated.

Figure 24:
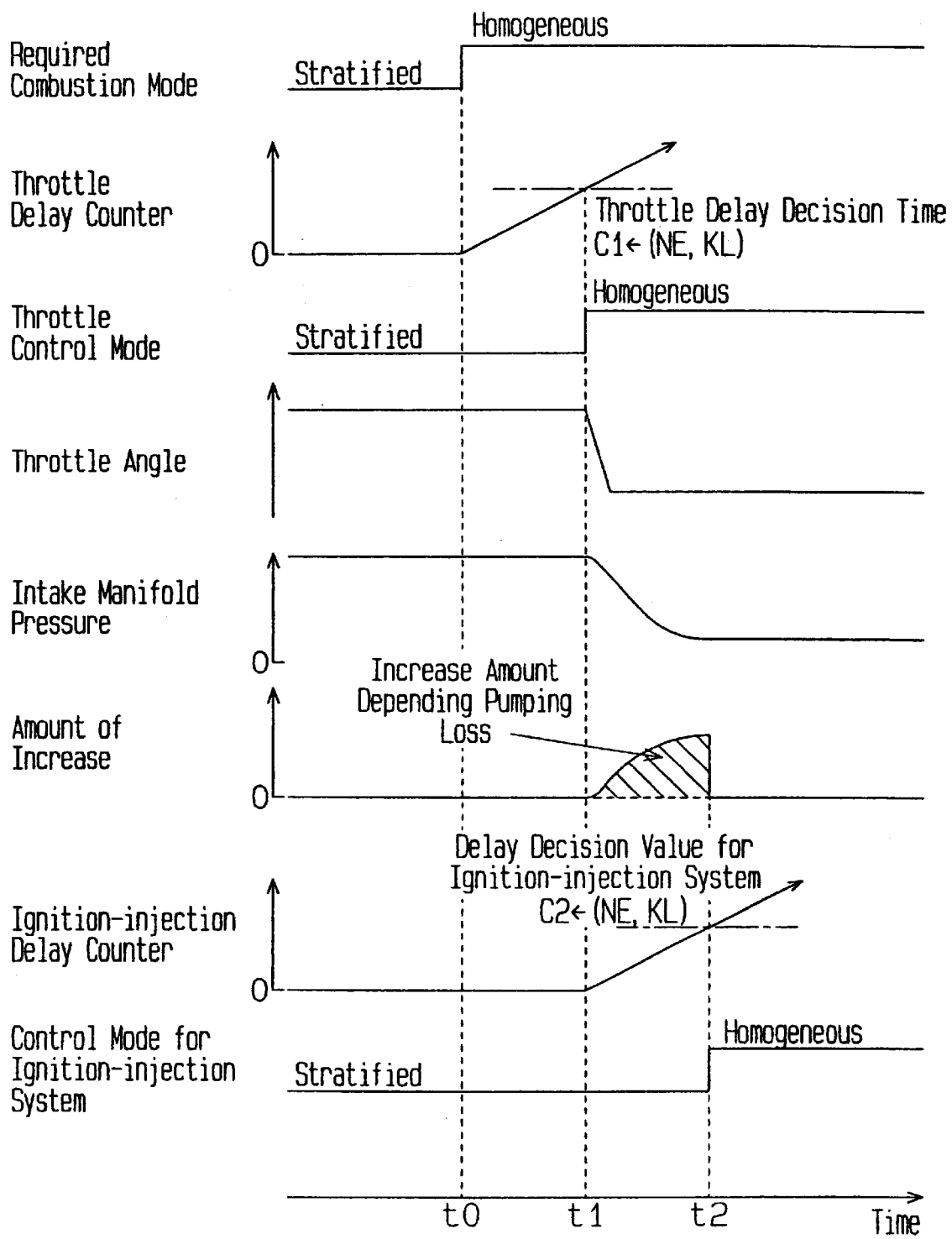
FIG. 24 is a timing chart for one example of combustion control according to the eighth embodiment.

FIG. 24 shows one example of combustion-mode switching control according to the eighth embodiment.

At time t0, a request to switching the combustion mode to the homogeneous-charge combustion mode is made and the angle of the EGR valve 16 starts changing.

At time t1, the value of the throttle delay counter reaches the throttle delay decision value C1. In response to this event, the throttle control mode is switched to the homogeneous-charge combustion mode and the throttle angle is reduced in accordance with the angle needed for the homogeneous-charge combustion mode.

At time t2, the value of the ignition-injection delay counter reaches the ignition-injection delay decision value C2. In response to this event, the control mode for the ignition-injection system is switched to the homogeneous-charge combustion mode.

In the period from time t1 to time t2, the control mode for the throttle valve 20 is switched to the homogeneous-charge combustion mode and the control mode for the ignition-injection system is kept in the stratified-charge combustion mode. Accordingly, the intake manifold pressure gradually drops and the pumping loss increases.

According to the eighth embodiment, the fuel injection amount is increased by a correcting amount from time t1 to time t2 in order to compensate for the pumping-loss induced reduction in the output torque of the engine 10. This correcting amount is set in accordance with the amount of a reduction in the intake manifold pressure after the alteration of the angle of the throttle valve 20 (time t1).

The eighth embodiment has the following advantage in addition to the advantage (1) of the first embodiment.

(13) As the fuel injection amount is corrected during the delay time, a reduction in the output torque of the engine 10 caused by the switching of the combustion mode is suppressed, thus allowing the drivability to be well maintained.

The eighth embodiment may be modified as follows.

The method of calculating the correcting amount of the fuel injection amount may be changed as long as it can set the fuel injection amount in such a way as to supplement the reduction in the output torque of the engine 10 that originates from an increase in the pumping loss.

Ninth Embodiment

As has been explained in the foregoing description of the third embodiment, when the running state of the engine 10 is in a transient state, a passenger in a vehicle is less likely to sense the degradation of the drivability as compared with the case where the running state of the engine 10 is in the steady running state. This can allow a shock at the time of switching the combustion mode to a certain degree. According to the third embodiment, therefore, when the running state of the engine 10 is in a transient state, the delay time is shortened to suppress an increase in the NOx emission and an increase in the stratified charge combustion noise.

When the engine 10 is running under a light load and a large amount of EGR gas is supplied, a large amount of EGR gas keeps remaining in the cylinder for a while after the angle of the EGR valve 16 is changed to the angle needed for the homogeneous-charge combustion mode. If switching to the homogeneous-charge combustion mode is carried out without a sufficient delay time when the engine 10 is running under a light load and a large amount of EGR gas is supplied, misfire is likely to occur due to the residual EGR gas. In this case, a large shock is generated, so that the passenger senses the degradation of the drivability.

In this respect, according to the ninth embodiment, when the running state of the engine 10 is in a state wherein shortening the delay time is not preferable, even if it is a transient state, the delay time is not shortened. That is, the delay time is made shorter only when the running state of the engine 10 is in a transient state and a predetermined running condition excluding a special running condition is satisfied.

Figure 25:
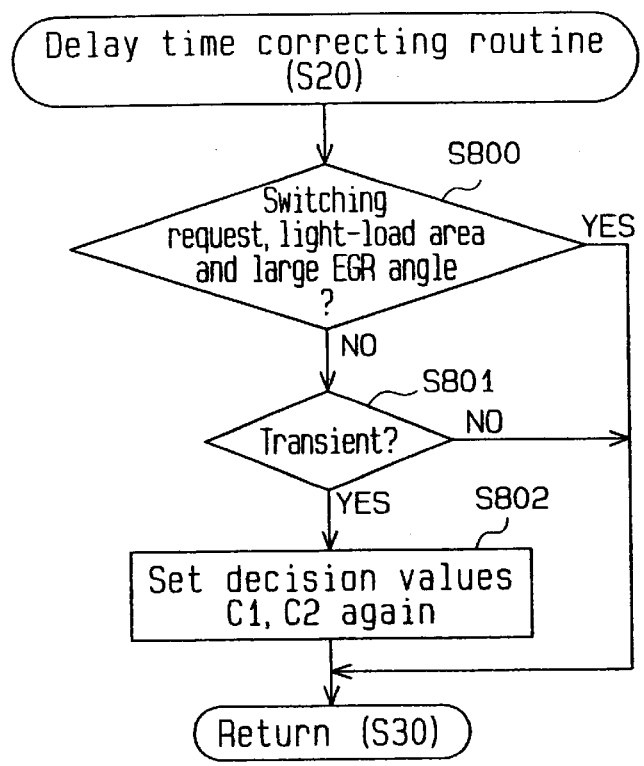
FIG. 25 is a flowchart of a delay-time correcting routine according to a ninth embodiment of this invention.

A delay-time correcting routine according to the ninth embodiment will be discussed below with reference to FIG. 25. This routine is executed as a subroutine when the operation goes to step 20 in the control routine in FIG. 4.

In the first step 800, the ECU 27 determines if the engine 10 had been running with a light load and the angle of the EGR valve 16 had been equal to or greater than a predetermined angle when a request to switch the combustion mode to the homogeneous-charge combustion mode was made. The decision in step 800 eliminates a specific running condition which is not preferable in shortening the delay time.

When the decision in step 800 is YES, the operation leaves this routine. In this case, the delay decision values C1 and C2 that were computed in steps 11 and 12 in FIG. 4 are used thereafter, thus securing a sufficient delay time.

When the decision in step 800 is NO, on the other hand, a predetermined condition excluding the aforementioned specific running condition is met. Therefore, the ECU 27 determines in step 801 if the running state of the engine 10 is in a transient state.

Figure 9:
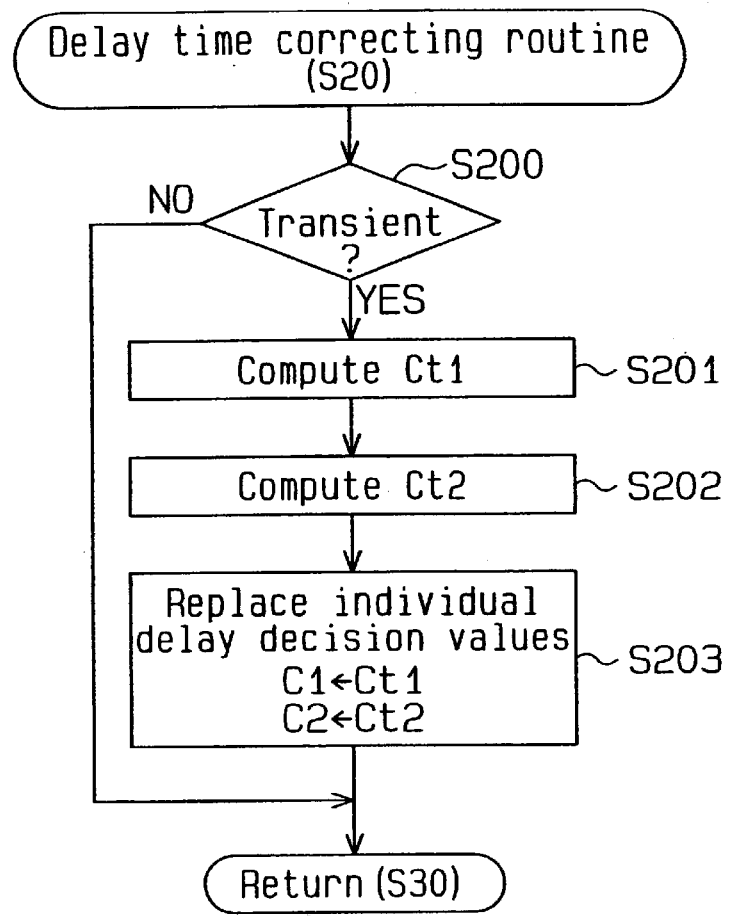
FIG. 9 is a flowchart of a delay-time correcting routine according to a third embodiment of this invention.

If the engine's running state is in a transient state (YES in step 801), the ECU 27 performs, in step 802, processes similar to, for example, those of steps 201 to 203 in FIG. 9 to change the individual delay decision values C1 and C2 in accordance with the transient degree θ in order make the delay time shorter than that in the steady running condition. That is, the delay decision values C1 and C2 are computed in consideration of the engine speed NE, the engine load KL and the transient degree θ in step 802. As a result, the delay time is changed in accordance with the delay decision values C1 and C2.

If the running state of the engine 10 is not in a transient state (NO in step 801), on the other hand, the operation leaves this delay-time correcting routine. In this case, the delay decision values C1 and C2 that were computed in steps 11 and 12 in FIG. 4 are used thereafter. In other words, if the engine 10 is running with a light load and a large amount of EGR gas is supplied when a request to switch the combustion mode to the homogeneous-charge combustion mode is made, a sufficient delay time is secured even when the running state of the engine 10 is in a transient state.

The ninth embodiment has the following advantage in addition to the aforementioned advantages (1), (3) and (4).

(14) The delay time is shortened when a running condition excluding a light-load running state where a large amount of EGR gas is supplied into the combustion chamber is satisfied and when the running state of the engine 10 is in a transient state. That is, when the engine 10 is running in a specific running condition where shortening the delay time causes a significant shock, the delay time is not shortened. This effectively suppresses an increase in the NOx emission and an increase in the stratified charge combustion noise.

The predetermined condition may be altered as long as this condition is set to exclude a specific running condition where shortening the delay time in the transient running state leads to the degradation of the drivability.

Tenth Embodiment

When the load of the engine 10 goes beyond the limit allowable in stratified charge combustion, the proper stratified charge combustion cannot continue. To cope with this situation, the sixth embodiment immediately switches the combustion mode to the homogeneous-charge combustion mode before the delay time elapses when the load of the engine 10 goes to a predetermined heavy-load area in order to avoid the continuation of the stratified charge combustion under undesirable conditions.

If the combustion mode is switched to the homogeneous-charge combustion mode before a sufficient delay time elapses under a specific running condition, however, misfire occurs, generating a large shock.

In this respect, the tenth embodiment restricts the transition of the running state of the engine 10 to a predetermined heavy-load area until switching to the homogeneous-charge combustion mode is completed under a predetermined running condition where compelled switching of the combustion mode is undesirable. This provides a sufficient delay time to prevent the stratified charge combustion from continuing under undesirable conditions.

Figure 26:
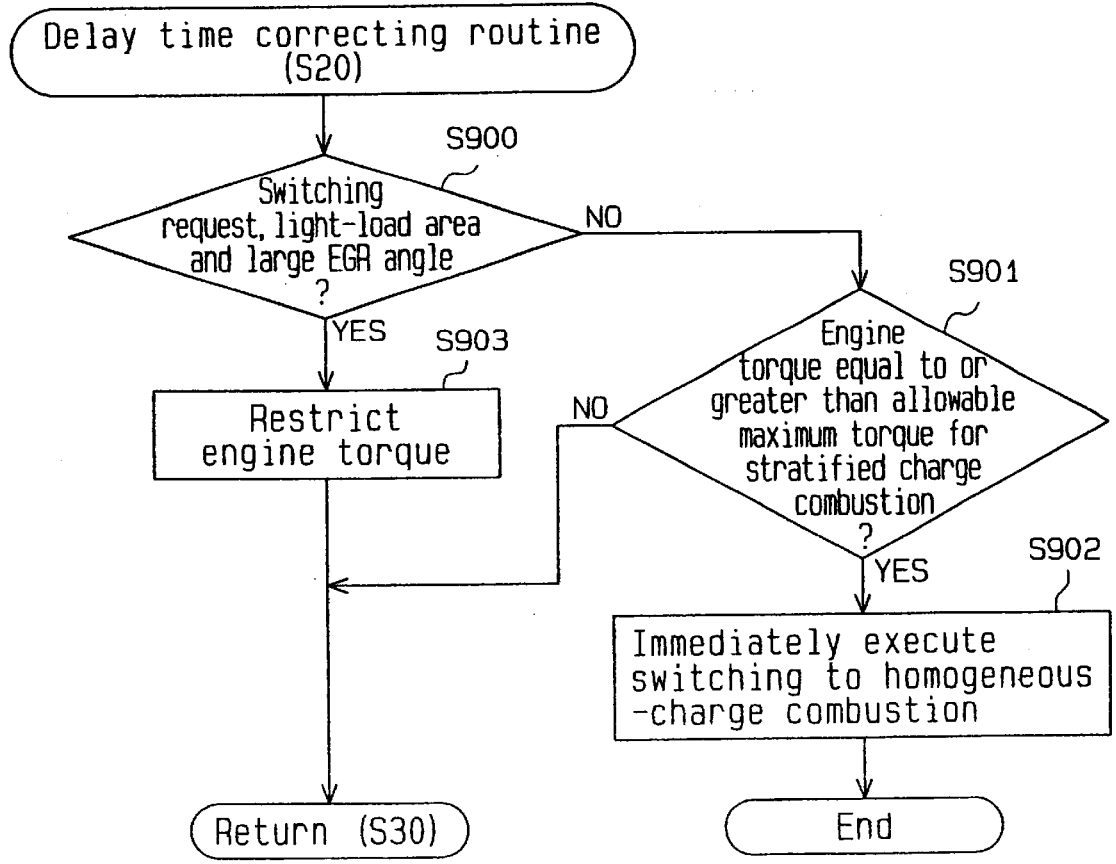
FIG. 26 is a flowchart of a delay-time correcting routine according to a tenth embodiment of this invention.

A delay-time correcting routine according to the tenth embodiment will be discussed referring to FIG. 26. This routine is executed as a subroutine when the operation goes to step 20 in the control routine in FIG. 4.

In the first step 900, the ECU 27 determines if the engine 10 is running with a light load and the angle of the EGR valve 16 is larger than a predetermined angle when a request to switch the combustion mode to the homogeneous-charge combustion mode is made. That is, it is determined if the running condition of the engine 10 is such that the forced switching to the homogeneous-charge combustion mode without waiting for the elapse of the delay time is not desirable. The decision in step 900 eliminates the specific running condition where it is undesirable to compel mode switching to the homogeneous-charge combustion mode before the delay time passes.

When the decision in step 900 is NO, the ECU 27 determines in step 901 if the torque of the engine 10 is equal to or greater than the allowable maximum torque for stratified charge combustion. If the engine torque is smaller than the allowable maximum torque (NO in step 901), the operation leaves this delay-time correcting routine. In this case, the delay decision values C1 and C2 that were computed in steps 11 and 12 in FIG. 4 are used thereafter, thus securing a sufficient delay time.

If the torque of the engine 10 is equal to or greater than the allowable maximum torque (YES in step 901), the ECU 27 forcibly and promptly switches the combustion mode to the homogeneous-charge combustion mode.

When the decision in step 900 is YES, in step 903, the ECU 27 restricts the torque of the engine 10 in such a way as not to exceed the allowable maximum torque for stratified charge combustion until switching to the homogeneous-charge combustion mode is completed. Then, the operation leaves this delay-time correcting routine. In this case, the delay decision values C1 and C2 that were computed in steps 11 and 12 in FIG. 4 are used thereafter, thus securing a sufficient delay time. As a result, the combustion mode is switched after the passing of a sufficient delay time under a predetermined condition, thus evading combustion in a heavy-load area which is not desirable for the continuation of the stratified charge combustion.

The combustion control apparatus according to the tenth embodiment has the following advantage in addition to the advantages (1), (7) and (8).

(15) When the running state of the engine 10 is shifted to a heavy-load condition where the continuation of the stratified charge combustion is undesirable, the combustion mode is immediately switched to the homogeneous-charge combustion mode even before the delay time elapses. This allows the execution of the stratified charge combustion to be avoided in an inadequate condition. When the engine 10 is running under a condition where forced switching of the combustion mode is undesirable, this embodiment restrains the load of the engine 10 from going to a predetermined heavy-load area until switching to the homogeneous-charge combustion mode is completed. This allows the stratified charge combustion to continue until a sufficient delay time elapses, so that undesirable switching of the combustion mode is avoided. This adequately suppresses the degradation of the drivability.

In the tenth embodiment, the predetermined condition can be changed. The predetermined condition should be set in such a way that when the engine 10 is running under a condition in which forced switching of the combustion mode is undesirable, the shifting of the load of the engine 10 to a predetermined heavy-load area is restricted until switching to the homogeneous-charge combustion mode is completed.

The first to tenth embodiments can be further modified as follows.

The combustion control apparatuses of the above-described embodiments may be adapted to an engine of any structure as long as the engine switches the combustion mode between stratified-charge combustion mode and the homogeneous-charge combustion mode in accordance with the engine's running state and switches the combustion mode from the stratified-charge combustion mode to the homogeneous-charge combustion mode in such a manner that the mode switching takes place after a predetermined delay time passes since the changing of the angle of the EGR valve to the angle needed for the homogeneous-charge combustion mode.

The switching controls of the individual embodiments can be combined as needed. That is, the structure (A) which sets the delay time from the changing of the angle of the EGR valve to the angle needed for the homogeneous-charge combustion mode to the switching of the combustion mode, based on the engine speed NE and the engine load KL may be combined with at least one of the following features (a) to (k).

(a) The delay time is set based on the actual angle of the EGR valve.

(b) The delay time is set shorter when the running state of the engine is in a transient state than when the engine is in a steady running state.

(c) In the case (b), the greater the transient degree θ is, the shorter the delay time is set.

(d) The delay time is set shorter when the lock-up clutch is at the release position or the slip position than when it is at the engage position.

(e) The delay time when the set air-fuel ratio in the homogeneous-charge combustion mode is richer than the stoichiometric air-fuel ratio is set shorter than the one when the set air-fuel ratio is equal to the stoichiometric air-fuel ratio.

(f) When the engine load is shifted to a predetermined heavy-load area during the delay time, the combustion mode is switched to the homogeneous-charge combustion mode before the delay time elapses.

(g) When the engine load is in a predetermined light-load area, switching from the stratified-charge combustion mode to the homogeneous-charge combustion mode is inhibited.

(h) In the case (g), when it is predicted that the engine load will be shifted to the predetermined light-load area, switching from the stratified-charge combustion mode to the homogeneous-charge combustion mode is inhibited.

(i) In the case (g) or (h), when it is predicted that the engine load will leave the predetermined light-load area, switching from the stratified-charge combustion mode to the homogeneous-charge combustion mode is permitted even when the engine load is in the predetermined light-load area.

(j) In the case (i), the combustion mode is switched to the homogeneous-charge combustion mode from the stratified-charge combustion mode before the delay time elapses.

(k) During the delay time, the fuel injection amount is increased to compensate for the pumping loss that is produced as the stratified charge combustion continues with the angle of the throttle valve reduced.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A combustion control apparatus for an internal combustion engine that has an exhaust manifold, an intake manifold, an EGR passage for connecting the exhaust manifold to the intake manifold, and an EGR valve located in the EGR passage, and runs in a stratified-charge combustion mode or a homogeneous-charge combustion mode in accordance with a running state, the combustion control apparatus comprising:

angle changing means for changing an angle of the EGR valve to an angle needed for the homogeneous-charge combustion mode at a time of switching a combustion mode from the stratified-charge combustion mode to the homogeneous-charge combustion mode;

mode switching means for switching from the stratified-charge combustion mode to the homogeneous-charge combustion mode when a predetermined delay time elapses after a request for switching the combustion mode has been made; and delay-time setting means for setting the delay time based on engine speed and engine load, wherein the engine further comprises a transmission gear and a lock-up clutch for selectively connecting the engine to the transmission gear in an engage position and a release position, and the lock-up clutch permits partial connection between the engine and the transmission gear at a slip position; and the delay-time setting means sets the delay time shorter when the lock-up clutch is at the release position or the slip position than when the lock-up clutch is at the engage position.

2. The combustion control apparatus according to claim 1, wherein the delay-time setting means sets the delay time based on an actual angle of the EGR valve.

3. The combustion control apparatus according to claim 1, wherein the delay-time setting means sets the delay time shorter when the running state of the engine is in a transient state than when the running state of the engine is in a steady running state.

4. The combustion control apparatus according to claim 3, wherein the delay-time setting means sets the delay time shorter when the engine is in a transient running state where a predetermined condition is met than that in a state excluding the transient running state.

5. The combustion control apparatus according to claim 1, wherein the delay-time setting means sets the delay time shorter when an air-fuel ratio set in the homogeneous-charge combustion mode is richer than a stoichiometric air-fuel ratio than that when the set air-fuel ratio is the stoichiometric air-fuel ratio.

6. The combustion control apparatus according to claim 1, wherein the mode switching means switches the combustion mode to the homogeneous-charge combustion mode before the delay time elapses, when the engine load reaches a predetermined heavy-load area during the delay time.

7. The combustion control apparatus according to claim 6, further comprising restriction means for restricting shifting of the engine load to the predetermined heavy-load area until switching to the homogeneous-charge combustion mode is completed, while the engine is running under a predetermined running condition.

8. The combustion control apparatus according to claim 1, further comprising switching inhibition means for inhibiting mode switching to the homogeneous-charge combustion mode from the stratified-charge combustion mode when the engine load is in a predetermined light-load area.

9. The combustion control apparatus according to claim 8, wherein the switching inhibition means inhibits mode switching to the homogeneous-charge combustion mode from the stratified-charge combustion mode when it is predicted that the engine load will be shifted to the predetermined light-load area from an area outside the predetermined light-load area.

10. The combustion control apparatus according to claim 8, further comprising switching permitting means for permitting mode switching to the homogeneous-charge combustion mode from the stratified-charge combustion mode even if the engine load lies in the predetermined light-load area when it is predicted that the engine load will deviate from the predetermined light-load area.

11. The combustion control apparatus according to claim 10, further comprising switching enforcing means for switching the combustion mode to the homogeneous-charge combustion mode before the delay time elapses when switching of the combustion mode is permitted by the switching permitting means and a request to switch the stratified-charge combustion mode to the homogeneous-charge combustion mode is made.

12. The combustion control apparatus according to claim 1, wherein the delay-time setting means starts to count the delay time when the angle changing means changes the EGR valve angle.

13. The combustion control apparatus according to claim 1, wherein the engine has a fuel injector for supplying fuel in a combustion chamber and a spark plug for igniting the fuel, and the mode switching means controls the fuel injector and the spark plug to change a fuel supply amount, a fuel supply timing and an ignition timing.

14. A combustion controlling method for an internal combustion engine that has an exhaust manifold, an intake manifold, an EGR passage for connecting the exhaust manifold to the intake manifold, and an EGR valve disposed in the EGR passage, and runs in a stratified-charge combustion mode or a homogeneous-charge combustion mode in accordance with a running state, the method comprising:
    changing an angle of the EGR valve to an angle needed for the homogeneous-charge combustion mode at a time of switching a combustion mode from the stratified-charge combustion mode to the homogeneous-charge combustion mode;
    switching from the stratified-charge combustion mode to the homogeneous-charge combustion mode when a predetermined delay time elapses after a request for switching the combustion mode has been made; and
    setting the delay time based on engine speed and engine load, wherein the engine further comprises a transmission gear and a lock-up clutch for selectively connecting the engine to the transmission gear in an engage position and a release position, and the lock-up clutch permits partial connection between the engine and the transmission gear at a slip position, and wherein in the delay-time setting step, the delay time is set shorter when the lock-up clutch is at the release position or the slip position than when the lock-up clutch is at the engage position.

15. The method according to claim 14, wherein the delay time is set based on an actual angle of the EGR valve.

16. The method according to claim 14, wherein the delay time is set shorter when the running state of the engine is in a transient state than when the running state of the engine is in a steady running state.

17. The method according to claim 16, wherein the delay time is set shorter when the engine is in a transient running state where a predetermined condition is met than that in a state excluding the transient running state.

18. The method according to claim 14, the delay time is set shorter when an air-fuel ratio set in the homogeneous-charge combustion mode is richer than a stoichiometric air-fuel ratio than that when the set air-fuel ratio is the stoichiometric air-fuel ratio.

19. The method according to claim 14, wherein in the mode switching step, the combustion mode is switched to the homogeneous-charge combustion mode before the delay time elapses, when the engine load reaches a predetermined heavy-load area during the delay time.

20. The method according to claim 19 further comprising restricting shifting of the engine load to the predetermined heavy-load area until switching to the homogeneous-charge combustion mode is completed, while the engine is running under a predetermined running condition.

21. The method according to claim 14 further comprising inhibiting mode switching to the homogeneous-charge combustion mode from the stratified-charge combustion mode when the engine load is in a predetermined light-load area.

22. The method according to claim 21, wherein in the inhibition step, mode switching to the homogeneous-charge combustion mode from the stratified-charge combustion mode is inhibited when it is predicted that the engine load will be shifted to the predetermined light-load area from an area outside the predetermined light-load area.

23. The method according to claim 21 further comprising permitting mode switching to the homogeneous-charge combustion mode from the stratified-charge combustion mode even if the engine load lies in the predetermined light-load area when it is predicted that the engine load will deviate from the predetermined light-load area.

24. The method according to claim 23 further comprising switching enforcing the combustion mode to the homogeneous-charge combustion mode before the delay time elapses when switching of the combustion mode is permitted in the switching permitting step and a request to switch the stratified-charge combustion mode to the homogeneous-charge combustion mode is made.

25. The method according to claim 14, wherein the delay-time setting step includes counting the delay time after the EGR valve angle is changed.

* * * * *